US012628154B2

(12) United States Patent
Sun et al.

(10) Patent No.: US 12,628,154 B2
(45) Date of Patent: May 12, 2026

(54) SIDELINK RESOURCE ALLOCATION IN UNLICENSED SPECTRUM

(71) Applicant: QUALCOMM Incorporated, San Diego, CA (US)

(72) Inventors: Jing Sun, San Diego, CA (US); Ozcan Ozturk, San Diego, CA (US); Juan Montojo, San Diego, CA (US); Tao Luo, San Diego, CA (US); Xiaoxia Zhang, San Diego, CA (US); Peter Gaal, San Diego, CA (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 18/040,960

(22) PCT Filed: Oct. 9, 2020

(86) PCT No.: PCT/CN2020/119928
§ 371 (c)(1),
(2) Date: Feb. 7, 2023

(87) PCT Pub. No.: WO2022/073183
PCT Pub. Date: Apr. 14, 2022

(65) Prior Publication Data
US 2023/0269730 A1      Aug. 24, 2023

(51) Int. Cl.
*H04W 72/1263*        (2023.01)
*H04L 5/00*        (2006.01)
(Continued)

(52) U.S. Cl.
CPC ....... *H04W 72/1263* (2013.01); *H04L 5/0041* (2013.01); *H04L 5/0044* (2013.01);
(Continued)

(58) Field of Classification Search
CPC ......... H04W 72/1263; H04W 74/0808; H04W 76/14; H04W 16/14; H04L 5/0041; H04L 5/0044; H04L 5/0053
See application file for complete search history.

(56) References Cited

U.S. PATENT DOCUMENTS

2017/0288794 A1    10/2017  Yerramalli et al.
2019/0014577 A1     1/2019  Yang et al.
(Continued)

FOREIGN PATENT DOCUMENTS

CN        110547018  A    12/2019
CN        111435909  A     7/2020
WO        2020171478 A1    8/2020

OTHER PUBLICATIONS

Huawei, et al., "Corrections on the Wideband Operation Procedures", 3GPP TSG RAN WG1 Meeting #100-e, R1-2000201, Feb. 24, 2020-Mar. 6, 2020, 6 Pages, Mar. 6, 2020 (Mar. 6, 2020), pp. 1-4.

(Continued)

*Primary Examiner* — Chae S Lee
(74) *Attorney, Agent, or Firm* — Patterson & Sheridan LLP

(57) ABSTRACT

Certain aspects of the present disclosure provide techniques for communicating using sidelink resources allocated in an unlicensed spectrum. A method that may be performed by a first UE includes establishing a connection with a second UE for sidelink communication in an unlicensed spectrum and communicating with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

33 Claims, 16 Drawing Sheets

(51) Int. Cl.
  *H04W 74/0808*     (2024.01)
  *H04W 76/14*      (2018.01)
  *H04W 16/14*      (2009.01)

(52) U.S. Cl.
  CPC ....... *H04L 5/0053* (2013.01); *H04W 74/0808*
        (2013.01); *H04W 76/14* (2018.02); *H04W*
                    *16/14* (2013.01)

(56)           References Cited

U.S. PATENT DOCUMENTS

2019/0141694  A1     5/2019  Gupta et al.
2019/0215817  A1     7/2019  Chae et al.
2021/0329431  A1*  10/2021  Su ......................... H04L 5/0094
2024/0163926  A1*   5/2024  Jung ................... H04W 74/006

OTHER PUBLICATIONS

International Search Report and Written Opinion—PCT/CN2020/
119928—ISA/EPO—Jul. 19, 2021.
Fujitsu: "Remaining Issue on Wideband Operation", 3GPP TSG
RAN WG1 #102-e, R1-2005538, 3rd Generation Partnership Proj-
ect, Mobile Competence Centre, 650, Route Des Lucioles, F-06921
Sophia-Antipolis Cedex, France, vol. RAN WG1, No. e-Meeting,
Aug. 17, 2020-Aug. 28, 2020, Aug. 7, 2020, 2 Pages, XP051914976,
p. 1, line 5-line 8, p. 1, line 9.
Supplementary European Search Report—EP20956498—Search
Authority—The Hague—May 21, 2024.

\* cited by examiner

FIG. 7

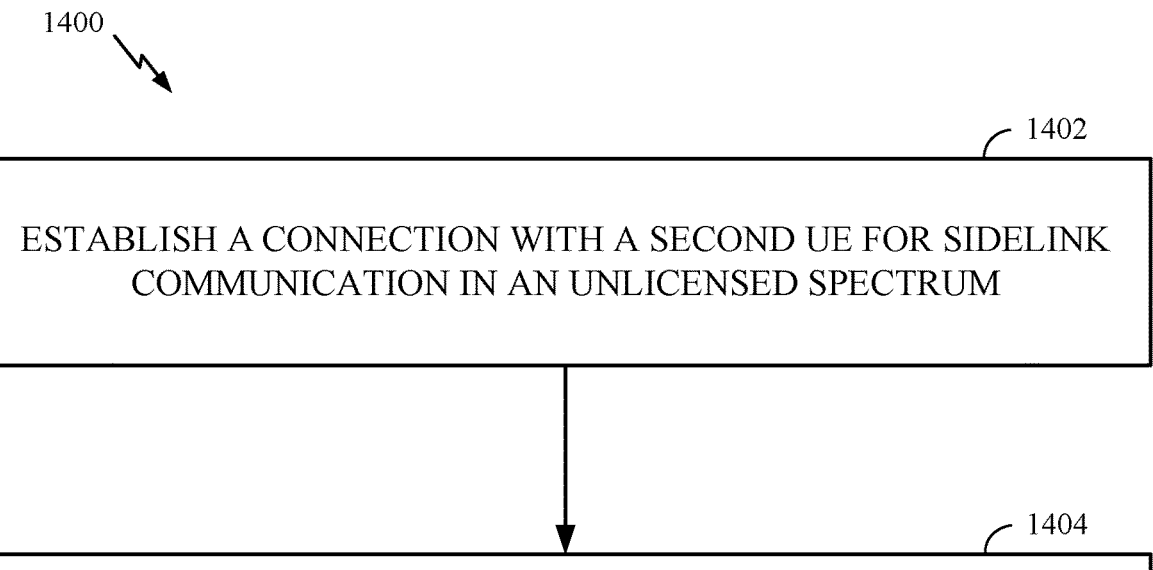

1400

1402

ESTABLISH A CONNECTION WITH A SECOND UE FOR SIDELINK COMMUNICATION IN AN UNLICENSED SPECTRUM

1404

COMMUNICATE WITH THE SECOND UE VIA THE CONNECTION USING ONE OR MORE SIDELINK SUB-CHANNELS IN THE UNLICENSED SPECTRUM ACCORDING TO A MAPPING BETWEEN SIDELINK SUB-CHANNELS AND RESOURCE BLOCK (RB) SETS OF THE UNLICENSED SPECTRUM, WHEREIN THE UNLICENSED SPECTRUM COMPRISES A PLURALITY OF RB SETS AND ONE OR MORE GUARD BANDS DISPOSED BETWEEN RB SETS IN THE PLURALITY RB SETS

FIG. 14

SIDELINK RESOURCE ALLOCATION IN UNLICENSED SPECTRUM

CROSS-REFERENCE TO RELATED APPLICATION(S)

This application is a national stage application under 35 U.S.C. 371 of PCT/CN2020/119928, filed Oct. 9, 2020, which is hereby expressly incorporated by reference herein in its entirety as if fully set forth below and for all applicable purposes.

INTRODUCTION

Aspects of the present disclosure relate to wireless communications, and more particularly, to techniques for sidelink resource allocation in unlicensed spectrum.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improvements to sidelink resource allocation in an unlicensed spectrum.

Certain aspects of the subject matter described in this disclosure can be implemented in a method for wireless communication by a user equipment (UE). The method generally includes establishing a connection with a second UE for sidelink communication in an unlicensed spectrum and communicating with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

Certain aspects of the subject matter described in this disclosure can be implemented in a first user equipment (UE) for wireless communication. The first UE generally includes means for establishing a connection with a second UE for sidelink communication in an unlicensed spectrum and means for communicating with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

Certain aspects of the subject matter described in this disclosure can be implemented in a first user equipment (UE) for wireless communication. The first UE generally includes a memory; and a processor coupled to the memory, the memory and the processor configured to: establish a connection with a second UE for sidelink communication in an unlicensed spectrum and communicate with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

Certain aspects of the subject matter described in this disclosure can be implemented in a computer-readable medium for wireless communication. The medium including instructions that, when executed by at least one processor of a first user equipment (UE), cause the at least one processor to establish a connection with a second UE for sidelink communication in an unlicensed spectrum and communicate with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 shows a comparison of an allocation of sidelink resources and resources allocated in an unlicensed spectrum, in accordance with certain aspects of the present disclosure.

FIG. 14 is a flow diagram illustrating example operations for wireless communication by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
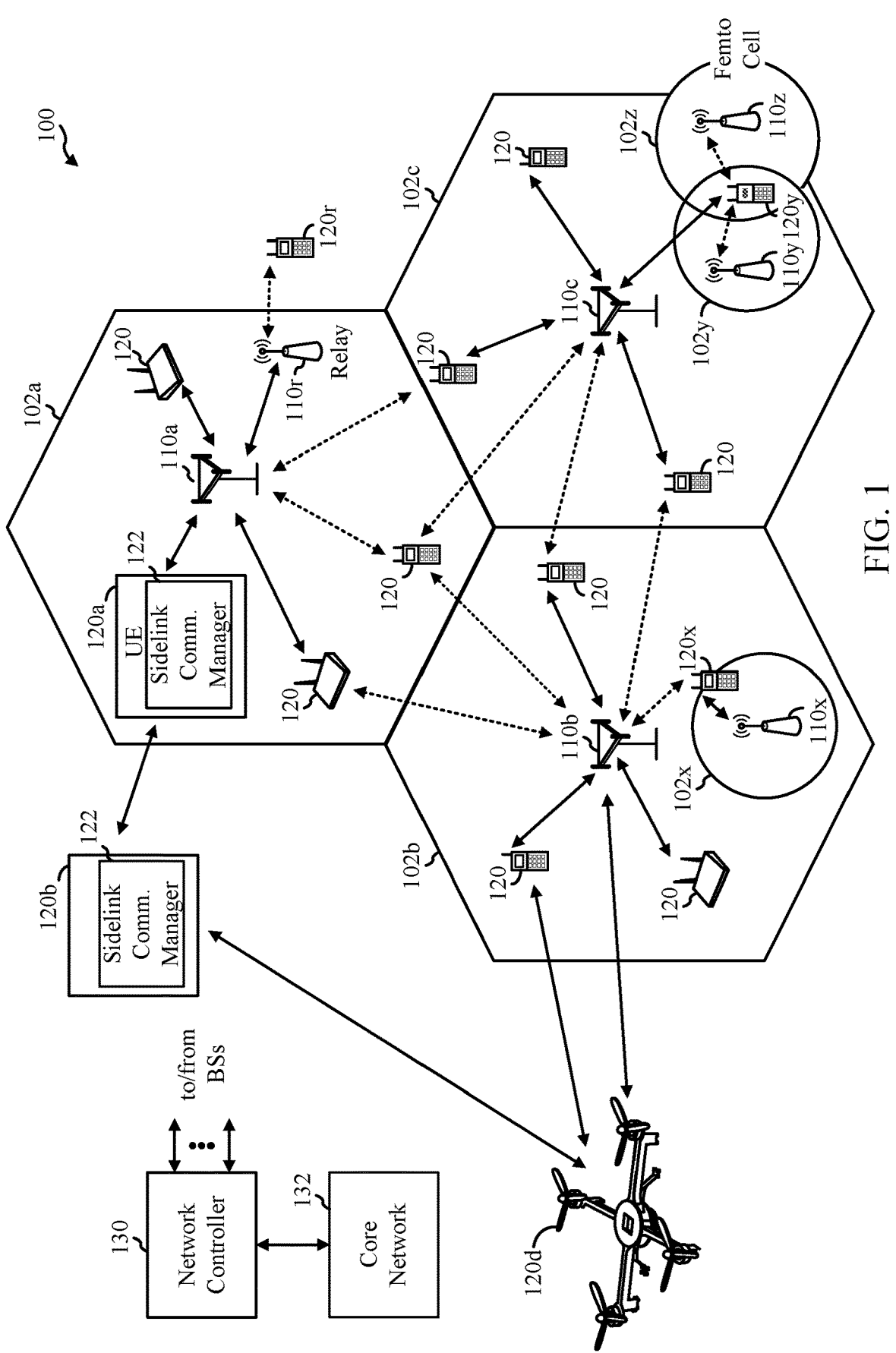
FIG. 1 is a block diagram conceptually illustrating an example wireless communication network, in accordance with certain aspects of the present disclosure.

Aspects of the present disclosure provide apparatus, methods, processing systems, and computer readable mediums for communicating using sidelink resources allocated in unlicensed spectrum. In particular, certain aspects relate to mapping sub-channels to resource blocks (RBs) in frequency in the unlicensed spectrum for sidelink communications.

In certain aspects, RBs may be assigned to sets (e.g., subbands), where each RB set includes a plurality of RBs. Further, a guard band (e.g., intra-cell guard band) may be defined between each of the RB sets. Accordingly, certain aspects herein related to mapping sub-channels to RBs while taking into account RB sets and guard bands. In certain aspects, sub-channels are mapped to RBs taking into account UE capabilities of the UEs communicating on a sidelink. For example, some UEs (e.g., high capability UEs) may be capable of receiving in guard bands, while some UEs (e.g., legacy or low capability UEs) may not be capable of receiving in guard bands. Aspects herein provide techniques that advantageously account for such factors while efficiently utilizing frequency spectrum in a way that would not be feasible without such techniques. Further, aspects herein provide techniques to allow both low capability and high capability UEs to communicate efficiently based on the sub-channel mapping.

The following description provides examples of communicating using sidelink resources allocated in unlicensed spectrum in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, the UEs 120 may be configured for communicating on one or more sidelink resources allocated in an unlicensed spectrum, as described herein. For example, as shown in FIG. 1, each of the UE 120a and the UE 120b includes a respective sidelink communication manager 122. The sidelink communication manager 122 may be configured to perform the operations illustrated in FIG. 14, as well as other operations described herein for communicating on one or more sidelink resources allocated in an unlicensed spectrum.

Figure 2:
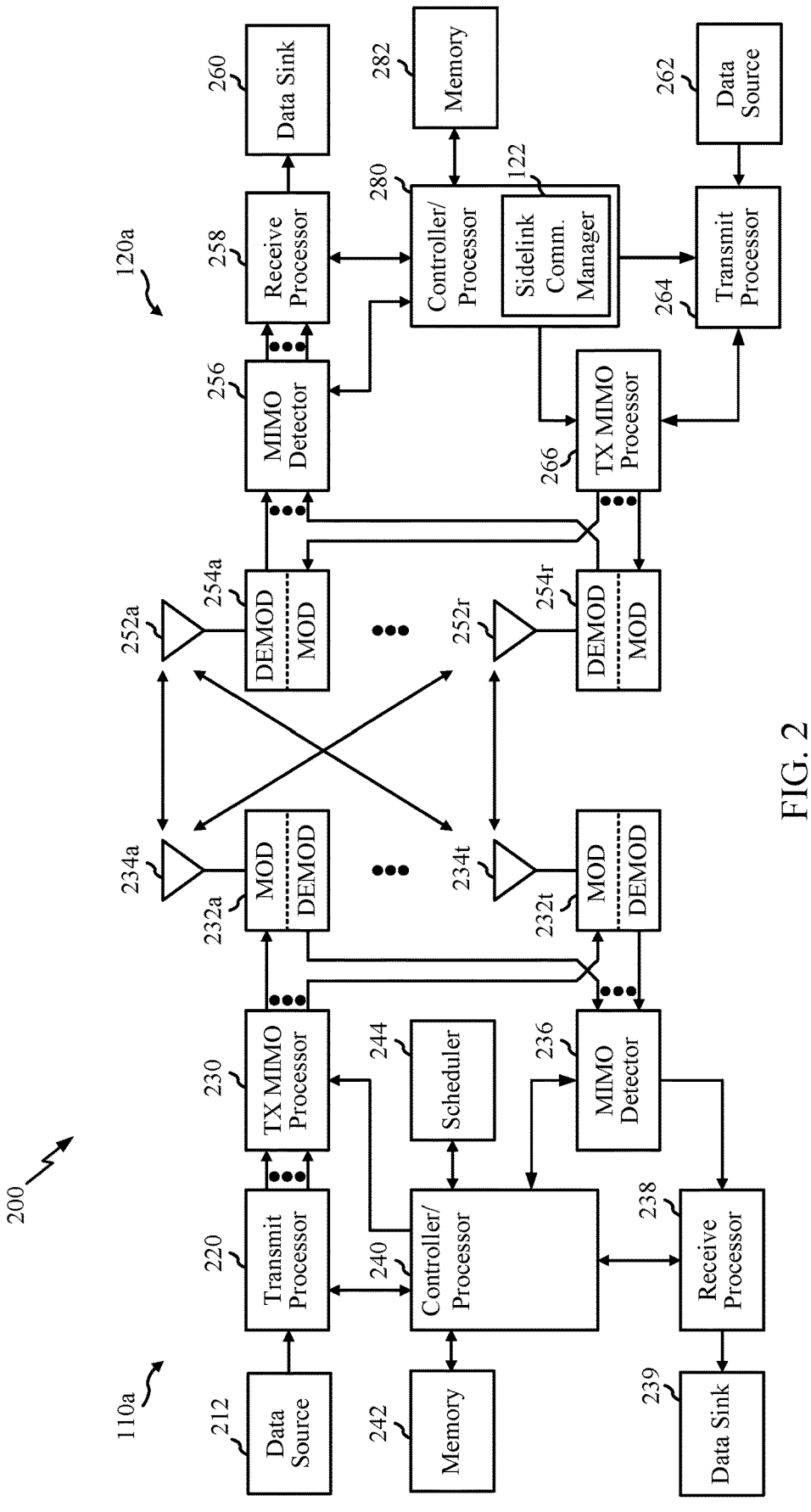
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has the sidelink communication manager 122 that may be configured to perform the operations illustrated in FIG. 14, as well as other operations disclosed herein for communicating using sidelink resources allocated in an unlicensed spectrum. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
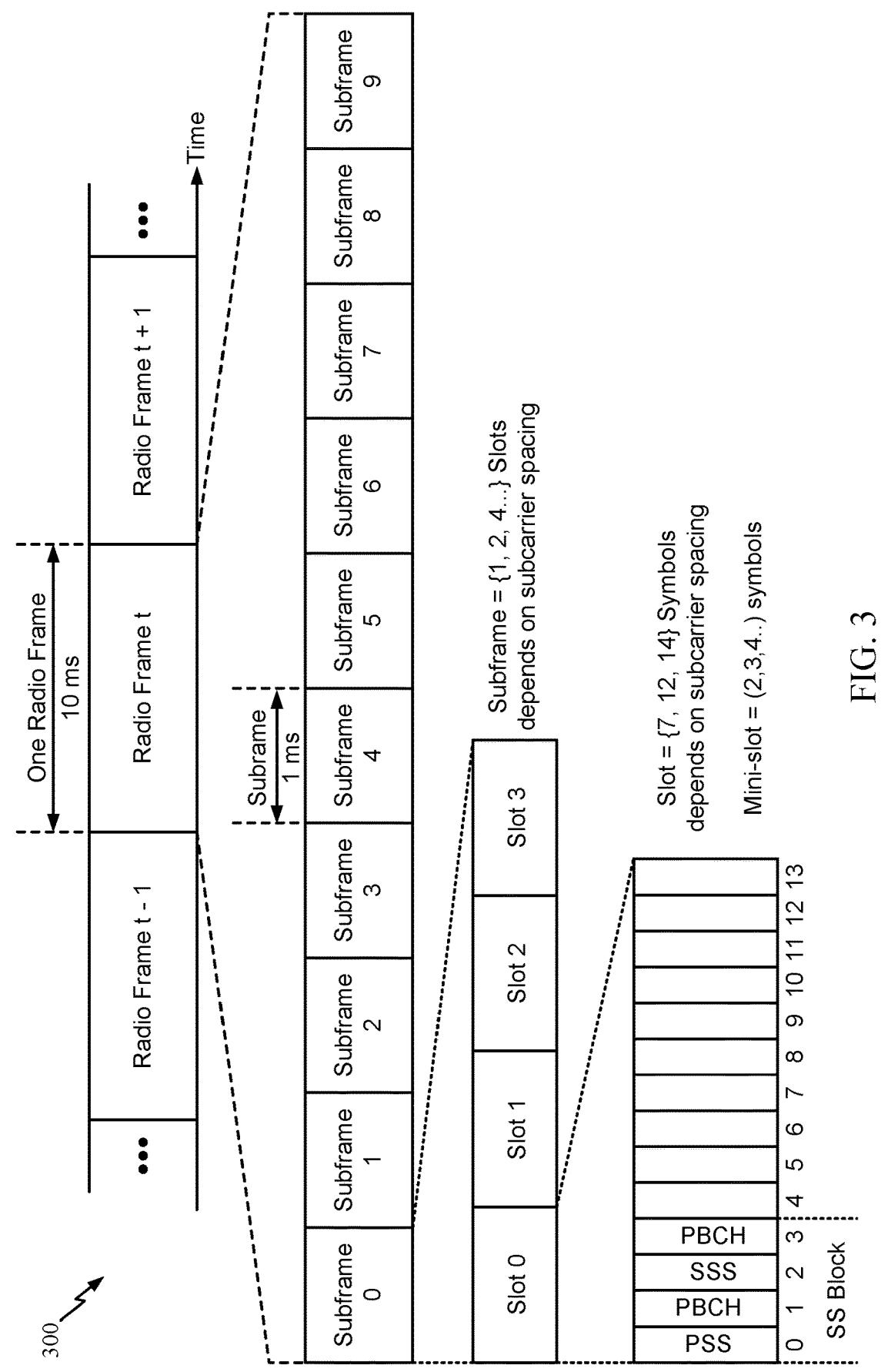
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4B:
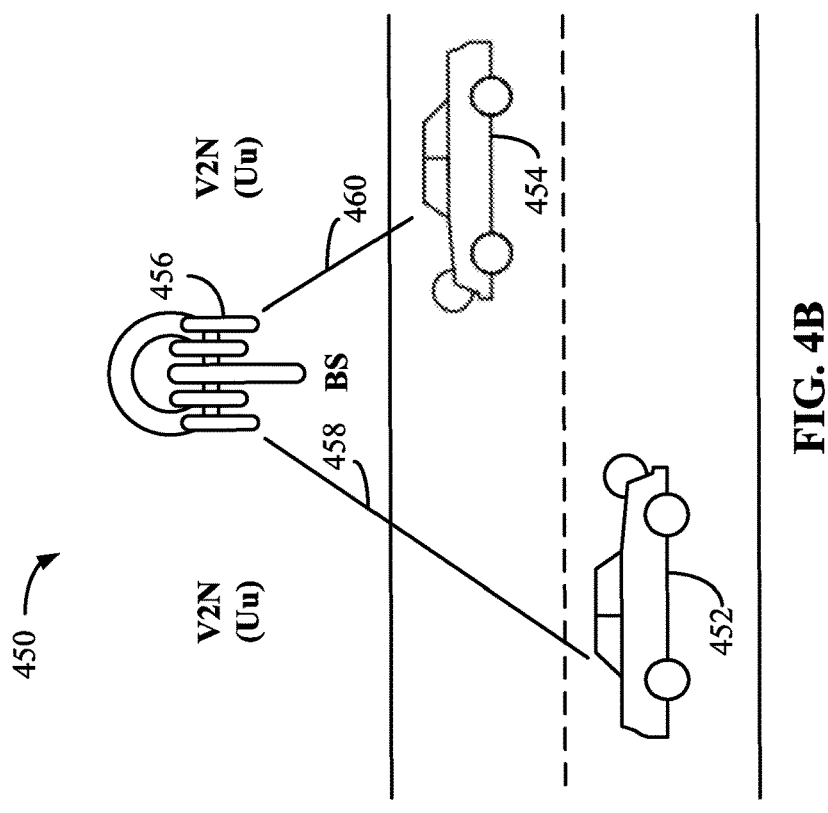
FIG. 4A and FIG. 4B show diagrammatic representations of example vehicle to everything (V2X) systems, in accordance with certain aspects of the present disclosure.
Figure 4A:
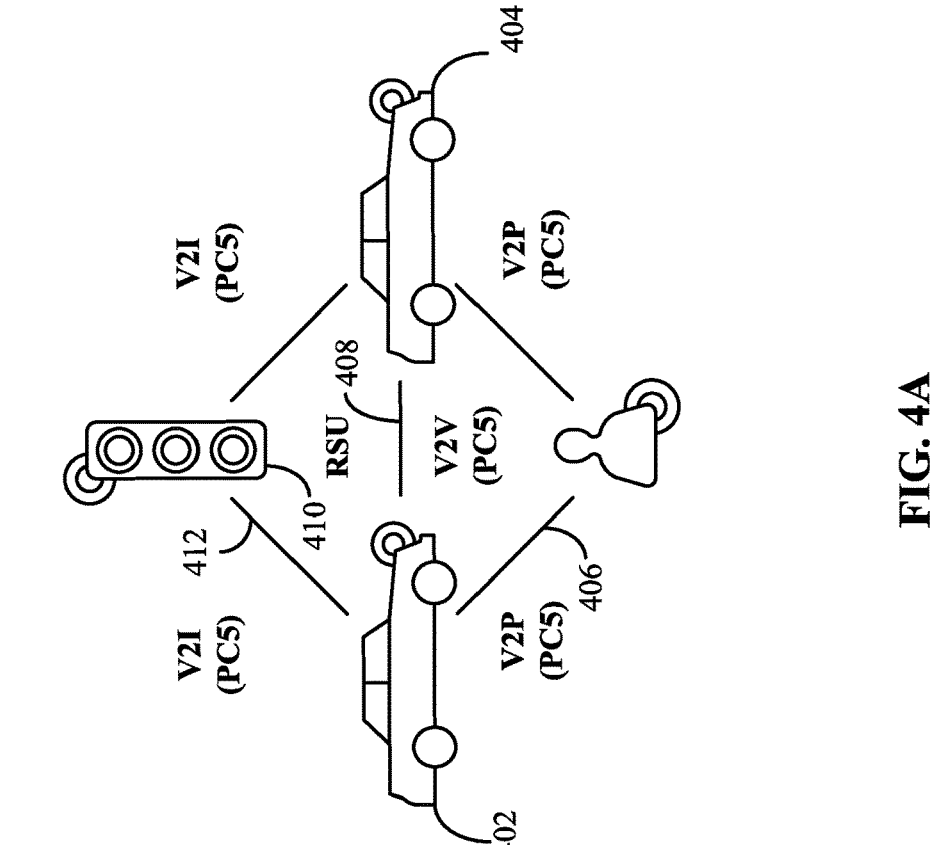

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles (e.g., UEs) 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110*a*), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Figure 4C:
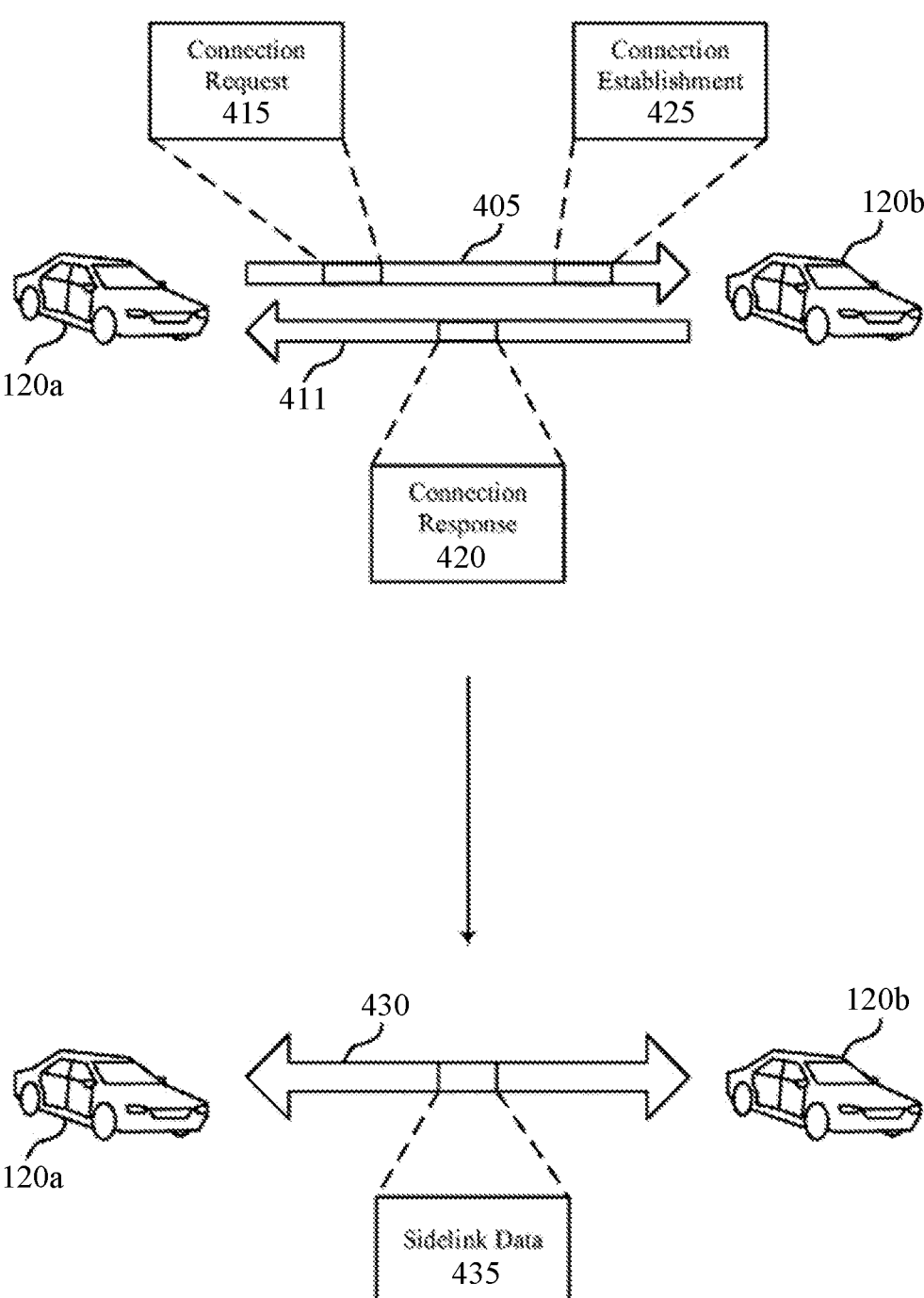
FIG. 4C illustrates an example sidelink connection establishment procedure, in accordance with certain aspects of the present disclosure.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source. Example Sidelink Connection Establishment FIG. 4C illustrates an example procedure for establishing a unicast sidelink connection in a V2X system 400, in accordance with aspects of the present disclosure. As shown, the V2X system 400 may include a first UE 120*a* and a second UE 120*b*, which may be examples of UEs 120 as described above with reference to FIG. 1. As described herein, UE 120*a* may attempt to establish a unicast connection over a sidelink with UE 120*b*. As shown, UE 120*a* and UE 120*b* may be vehicles, where the unicast connection over the sidelink may be a V2X communication link between UE 120*a* (e.g., a first vehicle) and UE 120*b* (e.g., a second vehicle). In some cases, the UE 120*a* may be an example of the vehicle 402 illustrated in FIG. 4A and UE 120*b* may be an example of the vehicle 404 illustrated in FIG. 4A.

Additionally or alternatively, the unicast connection over the sidelink may generally be used for sidelink communications (e.g., D2D communications) between any two UEs 120. In some cases, UE 120*a* may be referred to as an initiating UE 120 that initiates the unicast connection procedure, and UE 120*b* may be referred to as a target UE 120 that is targeted for the unicast connection procedure by the initiating UE 120.

For establishing the unicast connection, access stratum (AS) parameters may be configured and negotiated between UE 120*a* and UE 120*b*. For example, a transmission and reception capability matching may be negotiated between UE 120*a* and UE 120*b*. Each UE 120 (e.g., a V2X UE 120) may have different capabilities (e.g., transmission and reception capabilities, 64QAM, transmission diversity, carrier aggregation (CA) capabilities, etc.). In some cases, different services may be supported at the upper layers of corresponding protocol stacks for UE 120*a* and UE 120*b*. Additionally, a security association may be established between UE 120*a* and UE 120*b* for the unicast connection. Unicast traffic may benefit from security protection at a link level (e.g., Integrity Protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 120*a* and UE 120*b*.

In some cases, UE 120*b* may create a service announcement (e.g., a service capability message) to transmit over a cellular network (e.g., a CV2X network) to assist the unicast connection establishment. Conventionally, UE 120*a* may identify and locate candidates for unicast communications based on a basic service message (BSM) broadcasted unencrypted by nearby UEs 120 (e.g., UE 120*b*). The BSM may include location information, security and identity information, and vehicle information (e.g., speed, maneuver, size, etc.) for the corresponding UE 120 broadcasting the unencrypted BSM. However, for different wireless communications systems (e.g., D2D or V2X communications), a discovery channel may not be configured so that UE 120*a* is able to detect the BSM(s). Accordingly, the service announcement transmitted by UE 120*b* and other nearby UEs 120 (e.g., a discovery signal) may be an upper layer signal and broadcasted (e.g., in an NR sidelink broadcast). In some cases, UE 120*b* may include one or more parameters for itself in the service announcement, including connection parameters and/or capabilities UE 120*b* possesses. UE 120*a* may then monitor for and receive the broadcasted service announcement to identify potential UEs 120 for corresponding unicast connections. In some cases, UE 120*a* may identify the potential UEs 120 based on the capabilities each UE 120 indicates in their respective service announcements.

The service announcement may include information to assist UE 120*a* (e.g., or any initiating UE 120) to identify the UE 120 transmitting the service announcement. For example, the service announcement may include channel information where direct communication requests can be sent. In some cases, the channel information may be specific to a radio access technology (RAT) (e.g., LTE or NR) and may include a resource pool that UE 120*a* can use for transmitting the communication request. Additionally, the service announcement may include a specific destination address for the UE 120 (e.g., a layer 2 (L2) destination address) if the destination address is different from the current address (e.g., the address of the streaming provider or the UE 120 transmitting the service announcement). The service announcement may also include a network or transport layer for UE 120a to transmit a communication request on. For example, the network or transport layer may indicate a port number of an application for the UE 120 transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and quality of service (QoS)-related parameters.

After identifying a potential unicast connection target (e.g., UE 120b), UE 120a (e.g., the initiating UE 120) may transmit a connection request 415 to the identified target. In some cases, the connection request 415 may be a first RRC message transmitted by UE 120a to request a unicast connection with the identified target, UE 120b (e.g., an RRC-DirectConnectionSetupRequest message). For example, the unicast connection may be a PC5 unicast link, and the connection request 415 may be an RRC connection setup request message. Additionally, UE 120a may use a sidelink signaling radio bearer 405 to transport the connection request 415.

After receiving the connection request 415, UE 120b may determine whether to accept or reject the connection request 415. UE 120b may base this determination on a transmission/reception capability, an ability to accommodate the unicast connection over the sidelink, a particular service indicated for the unicast connection, the contents to be transmitted over the unicast connection, or a combination thereof. For example, if UE 120a wants to use a first RAT to transmit or receive data, but UE 120b does not support the first RAT, then UE 120b may reject the connection request 415. Additionally or alternatively, UE 120b may reject the connection request 415 based on being unable to accommodate the unicast connection over the sidelink due to one or more conflicts, such as a limited radio resource, a scheduling issue, etc. Accordingly, UE 120b may transmit an indication of whether the request is accepted or rejected in a connection response 420. Similar to UE 120a and the connection request 415, UE 120b may use a sidelink signaling radio bearer 411 to transport the connection response 420. Additionally, the connection response 420 may be a second RRC message transmitted by UE 120b in response to the connection request 415 (e.g., an RRCDirectConnectionResponse message).

In some cases, sidelink signaling radio bearers 405 and 411 may be a same sidelink radio signal bearer or may be separate sidelink signaling radio bearers. Accordingly, an RLC layer acknowledged mode (AM) may be used for sidelink signaling radio bearers 405 and 411. A UE 120 that supports the unicast connection may listen on a logical channel associated with the sidelink signaling radio bearers. In some cases, the AS layer may pass information directly through RRC signaling (e.g., control plane) instead of a V2X layer (e.g., data plane).

If the connection response 420 indicates that UE 120b accepted the connection request 415, UE 120a may then transmit a connection establishment 425 message on the sidelink signaling radio bearer 405 to indicate that the unicast connection setup is complete. In some cases, the connection establishment 425 may be a third RRC message (e.g., an RRCDirectConnectionSetupComplete message). Each of the connection request 415, the connection response 420, and the connection establishment 425 may use a basic capability when being transported from one of the UEs 120 to the other UE 120 to enable each UE 120 to be able to receive and decode a corresponding transmission (e.g., RRC message).

Additionally, identifiers may be used for each of the connection request 415, the connection response 420, and the connection establishment 425 (e.g., the RRC signaling). For example, the identifiers may indicate which UE 120 is transmitting which message and/or for which UE 120 the message is intended. For PHY channels, the RRC signaling and any subsequent data transmissions may use a same identifier (e.g., L2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a PHY layer ACK may be used for ensuring the corresponding messages are transmitted and received properly.

One or more information elements may be included in the connection request 415 and/or the connection response 420 for UE 120a and/or UE 120b, respectively, to enable negotiation of corresponding AS layer parameters for the unicast connection. For example, UE 120a and/or UE 120b may include PDCP parameters in a corresponding unicast connection setup message to set a PDCP context for the unicast connection. In some cases, the PDCP context may indicate whether or not PDCP duplication is utilized for the unicast connection. Additionally, UE 120a and/or UE 120b may include RLC parameters when establishing the unicast connection to set an RLC context of the unicast connection. For example, the RLC context may indicate whether an AM (e.g., a reordering timer (t-reordering) is used) or an unacknowledged mode (UM) is used for the RLC layer of the unicast communications.

Additionally, UE 120a and/or UE 120b may include MAC parameters to set a MAC context for the unicast connection. In some cases, the MAC context may enable resource selection algorithms, a HARQ feedback scheme (e.g., ACK or negative ACK (NACK) feedback), parameters for the HARQ feedback scheme, CA, or a combination thereof for the unicast connection. Additionally, UE 120a and/or UE 120b may include PHY layer parameters when establishing the unicast connection to set a PHY layer context for the unicast connection. For example, the PHY layer context may indicate a transmission format (unless transmission profiles are included for each UE 120) and a radio resource configuration (e.g., bandwidth part (BWP), numerology, etc.) for the unicast connection. These information elements may be supported for different frequency range configurations (e.g., frequency range 1 (FR1) for a sub-6 GHz frequency band, a frequency range 2 (FR2) for mmW, etc.).

In some cases, a security context may also be set for the unicast connection (e.g., after the connection establishment 425 message is transmitted). Before a security association (e.g., security context) is established between UE 120a and UE 120b, the sidelink signaling radio bearers 405 and 411 may not be protected (e.g., unencrypted). After a security association is established, the sidelink signaling radio bearers 405 and 411 may be protected (e.g., encrypted). Accordingly, the security context may enable secure data transmissions over the unicast connection and the sidelink signaling radio bearers 405 and 411. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, UE 120b may base its decision on whether to accept or reject the connection request 415 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, UE 120a and UE 120b may communicate using the unicast connection over a sidelink 430, where sidelink data 435 is transmitted between the two UEs 120. In some cases, the sidelink data 435 may include RRC messages transmitted between the two UEs 120. To maintain this unicast connection on sidelink 430, UE 120a and/or UE 120b may transmit a keep alive message (e.g., RRCDirectLinkAlive message, a fourth RRC message, etc.). In some cases, the keep alive message may be triggered periodically or on-demand (e.g., event-triggered). Accordingly, the triggering and transmission of the keep alive message may be invoked by UE 120a or by both UE 120a and UE 120b. Additionally or alternatively, a MAC control element (CE) (e.g., defined over sidelink 430) may be used to monitor the status of the unicast connection on sidelink 430 and maintain the connection. When the unicast connection is no longer needed (e.g., UE 120a travels far enough away from UE 120b), either UE 120a and/or UE 120b may start a release procedure to drop the unicast connection over sidelink 430. Accordingly, subsequent RRC messages may not be transmitted between UE 120a and UE 120b on the unicast connection after the unicast connection over sidelink 230 is dropped.

Example Sidelink Resource Allocation in Unlicensed Spectrum

When communicating on a sidelink a UE (e.g., UE 120) may use resources selected from a resource pool. The resource pool may be defined as a consecutive number of resource blocks (RBs) in the frequency domain in units of sub-channels. In other words, a resource pool may be composed of a plurality of consecutive RBs in frequency. In particular, a sub-channel may be defined as one or more of the RBs (e.g., that are consecutive), and a resource pool may be defined as one or more sub-channels.

Figure 5:
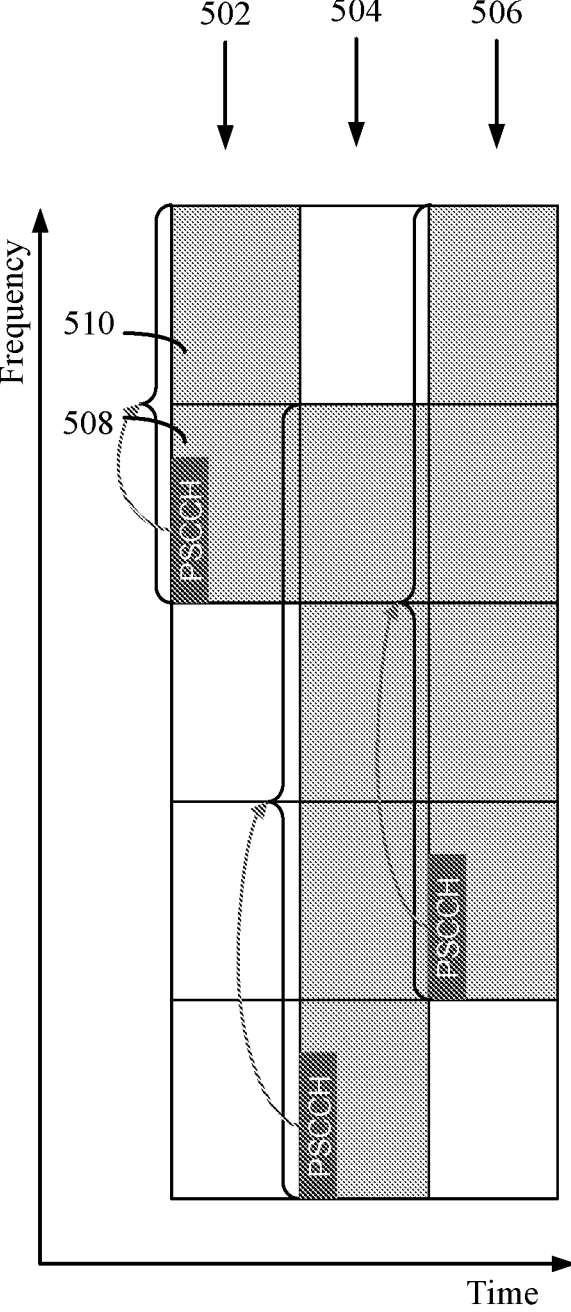
FIG. 5 shows a time-frequency grid illustrating example resource pools for sidelink communication, according to aspects of the present disclosure.

FIG. 5 shows a time-frequency grid illustrating example resource pools for sidelink communication, according to certain aspects presented here. As can be seen, three different resource pools (e.g., 502, 504, and 506) are shown. The resource pool 502 may be composed of two sub-channels 508 (e.g., assigned a physical sidelink control channel (PSCCH) and a physical sidelink shared channel (PSSCH)) and 510 (e.g., assigned to the PSSCH), each of the two sub-channels 508 and 510 including a consecutive set of RBs spanning different frequencies. As shown, resources pool 504 and 506 may each include four sub-channels spanning different frequency bands.

In some cases, a sidelink resource pool may be defined by a number of parameters, such as the parameters sl-StartRB-Subchannel, sl-SubchannelSize, and sl-NumSubchannel, though it should be noted that they can be referred to in any suitable way. The parameter sl-StartRB-Subchannel may define the first RB of the lowest index sub-channel of the resource pool. For example, with reference to resource pool 502, the parameter sl-StartRB-Subchannel may specify the first RB of the sub-channel 508. Additionally, the parameter sl-SubchannelSize may define the number of RBs of each sub-channel in the resource pool and the parameter sl-NumSubchannel may define the number of sub-channels in the resource pool. Accordingly, for example, with reference to resource pool 502, the parameter sl-NumSubchannel may define resource pool 502 to include two sub-channels (e.g.,

508 and 510) and the parameter sl-SubchannelSize may define that each of sub-channels 508 and 510 include 10 RBs to 100 RBs.

In some cases, within each subchannel, a sidelink control channel, such as a physical sidelink control channel (PSCCH), may occupy a first number of RBs (e.g., where the number is the value of the parameter sl-FreqResourcePS-CCH) and a first number of symbols (e.g., where the number is the value of a parameter sl-TimeResourcePSCCH) of the first sub-channel assigned to a sidelink shared data channel, such as a physical sidelink shared channel (PSSCH). In some cases, control information included in the PSCCH may allocate, starting from a current sub-channel in which the PSCCH is transmitted, how many sub-channels may be included within the PSSCH.

In some cases, it may be beneficial to perform sidelink communication using wideband channel operation within an unlicensed spectrum in order to take advantage of globally-available "free" spectrum. However, in some cases, performing sidelink communication in this unlicensed spectrum may present issues due to the way in which wideband channel operation is performed in the unlicensed spectrum.

For example, for operation in an unlicensed spectrum, as there may be an issue with coexistence with WiFi, channel access in the unlicensed spectrum may be divided among a plurality of 20 MHz subbands, even when the system is operating in wideband mode (e.g., multiples of 20 MHz). To be able to access a particular 20 MHz subband, a wireless device may first perform a listen before talk (LBT) procedure to determine whether that 20 MHz subband is available for use by the wireless device. A 20 MHz subband may be available for use if the wireless device senses that there are no other transmissions occurring in this 20 MHz subband for a period of time, indicating that the 20 MHz subband is in an idle state. In some cases, the wireless device may conclude that the 20 MHz subband is in the idle state by sensing an energy level on the 20 MHz subband. If the energy level of the 20 MHz subband is below a threshold, the wireless device may conclude that the 20 MHz subband is available for use. If, however, the LBT procedure does not pass (e.g., an energy level of the 20 MHz subband is greater than a threshold), the wireless device may try another 20 MHz bandwidth part.

Figure 6:
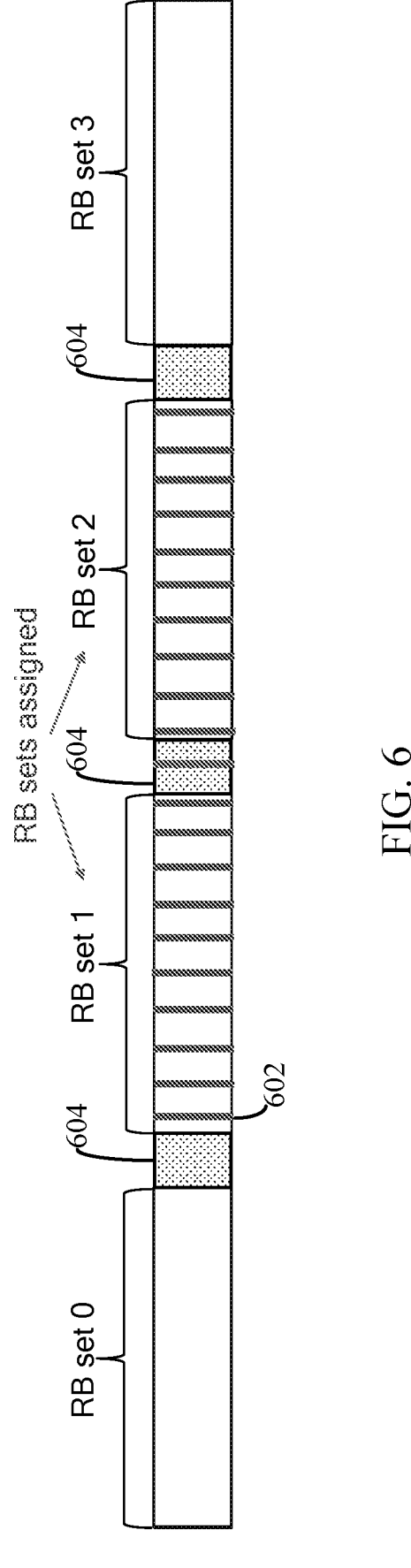
FIG. 6 illustrates an example resource allocation in an unlicensed spectrum, in accordance with certain aspects of the present disclosure.

To support this type of operation, such as in 5G new radio-unlicensed (NR-U), an intra-cell guard band is introduced to define guard band between each of the (e.g., approximately 20 MHz) subbands. The passband between two adjacent intra-cell guard band may be known as an "RB set," which may be approximately 20 MHz. For example, as illustrated in FIG. 6, the unlicensed spectrum may be split up into a plurality of RB sets, (e.g., each spanning roughly 20 MHz of bandwidth) including a plurality of RBs 602. As shown in the example illustrated in FIG. 6, the unlicensed spectrum may be divided into four different RB sets, including RB set 0, RB set 1, RB set 2, and RB set 3, and intra-cell guard bands 604 may be inserted between each RB set. It should be noted there may be a greater or lesser number of RB sets, and they may have a greater or lesser bandwidth/number of RBs. As noted above, to communicate using the unlicensed spectrum, a wireless device may perform a LBT procedure to sense which RB sets are available for communication. As shown in FIG. 6, RB set 1 and RB set 2 have passed the LBT procedure and are available for use/assignment by the wireless device.

In some cases, a (e.g., NR-U) system may support both contiguous and interlaced uplink resource allocations while complying with regulations. In the interlaced uplink resource allocation, the basic unit of resource allocation for the unlicensed channels is an interlace, which, for example, as illustrated in FIG. 6, is composed of ten equally spaced RBs 602 within a 20 MHz frequency bandwidth (e.g., RB set) for 15 KHz sub-carrier spacing. In certain aspects, for RBs that belong to an assigned set of interlaces but that fall in an intra-cell guard band, such RBs will be assigned only if the RB sets on both sides are assigned. Further, in some cases a wireless device, such as a UE, may transmit in the intra-cell guard band 604 if both RB sets on either side of the intra-cell guard band are allocated to the UE. Likewise, in some cases, a UE may also receive transmissions within the intra-cell guard band 604 if the UE is a high-capability UE. However, if the UE is a lower-capability UE, the UE may only be able to receive transmissions within an RB set and may not receive transmissions in the intra-cell guard band 604. In some cases, a UE may transmit information to a base station, indicating a capability of the UE. If the capability information indicates that the UE is a low-capability UE, the base station may avoid scheduling a physical downlink shared channel (PDSCH) on guard band RBs to this low-capability UE.

Figure 7:
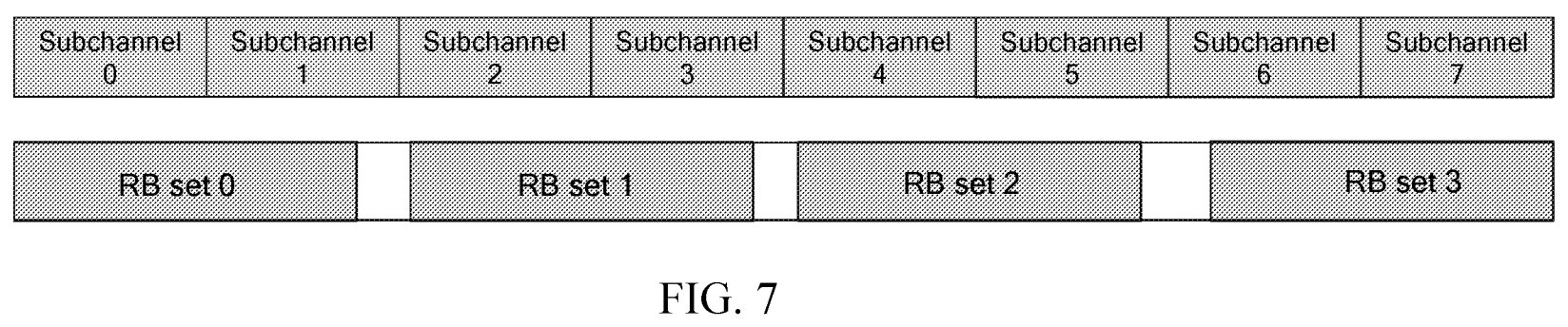

As noted above, it may be beneficial to perform sidelink communication using wideband channel operation within an unlicensed spectrum in order to take advantage of globally-available "free" spectrum. However, an issue that may exist with performing sidelink communication in the unlicensed spectrum is due to the way in which sidelink sub-channels are defined with respect to the way in which RB sets are defined within the unlicensed spectrum. For example, as noted above, sub-channels in the sidelink may be defined consecutively, without any spacing between different sub-channels. This presents an issue when mapping these consecutively-defined sub-channels to RB sets in the unlicensed band that include intra-cell guard bands disposed between RB sets. For example, as illustrated in FIG. 7, if the sidelink sub-channels are defined in a legacy fashion in which the sub-channels are consecutive, some sidelink sub-channels may partially overlap with intra-cell guard bands in the unlicensed spectrum, which may lead to these sidelink sub-channel being unusable by certain UEs (e.g., low-capability UEs) in the unlicensed spectrum.

Therefore, aspects of the present disclosure provide techniques to avoid situations in which certain sidelink sub-channels are unusable in the unlicensed spectrum. For example, in some cases, such techniques may involve a first UE establishing a connection with a second UE for sidelink communication in an unlicensed spectrum and communicating using one or more sidelink sub-channels in the unlicensed spectrum according to a mapping between sidelink sub-channels and RB sets of the unlicensed spectrum. In some cases, different mappings may exist between the one or more sidelink sub-channels and the RB sets of the unlicensed spectrum. In some cases, the UE may establish the connection with the second UE using techniques described above with respect to FIG. 4C.

Figure 8:
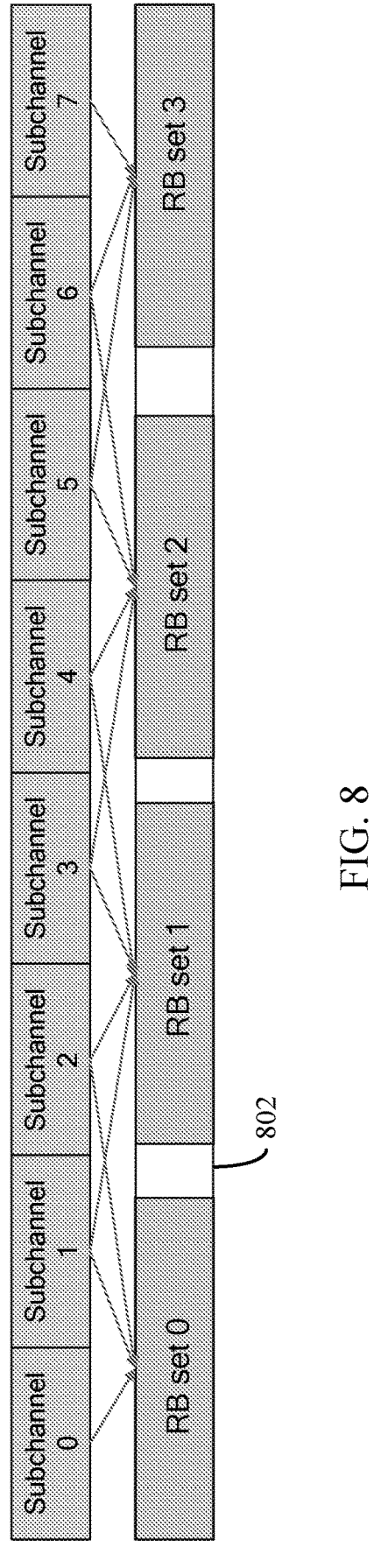
FIG. 8 illustrates a first mapping of sidelink sub-channels to resource block (RB) sets of an unlicensed spectrum, in accordance with certain aspects of the present disclosure.

In some cases, a first mapping for communicating using the one or more sidelink sub-channels in the unlicensed spectrum may involve continuously packing equal-sized sidelink sub-channels starting from a starting RB as legacy, but introducing a restriction that for a sidelink sub-channel that partially overlaps with intra-cell guard band, this sidelink sub-channel may only be used if a LBT procedure passes in the two RB sets on either side of the intra-cell guard band. FIG. 8 provides an illustration of this mapping.

For example, as illustrated in FIG. 8, the first mapping between the sidelink sub-channels and RB sets of the unlicensed spectrum comprises sidelink sub-channels being mapped continuously across a plurality of RB sets and plurality of intra-cell guard bands 802 in the unlicensed spectrum. As shown, when continuously mapped within the unlicensed spectrum, certain sidelink sub-channels may partially overlap intra-cell guard bands in the unlicensed spectrum. In such cases, use of these overlapping sidelink sub-channels may depend on a LBT procedure performed in the RB sets on either side of the intra-cell guard band that the sidelink sub-channels overlap. FIG. 8 illustrates the RB set LBT dependency for each sidelink sub-channel. For example, as illustrated, use of sidelink sub-channel 0 may only depend on a LBT procedure performed in RB set 0, whereas use of sidelink sub-channel 1 may depend on a LBT procedure performed in RB set 0 and RB set 1 since sidelink sub-channel 1 partially overlaps an intra-cell guard band.

For example, as shown, sidelink sub-channel 1 may span at least RB set 0 of the unlicensed spectrum and a first intra-cell guard band 802 disposed between the RB set 0 and RB set 1. In such cases, in order to communicate with the second UE using the sidelink sub-channel 1 that spans/overlaps the first intra-cell guard band 802, the first UE may need to perform a LBT procedure across the RB set 0 and RB set 1 to determine whether resources in the RB set 0 and resources in RB set 1 are available for use.

According to aspects, when, based on the LBT procedure, the resources in RB set 0 are available for use and the resources in RB set 1 are available for use (e.g., when the LBT procedure passes in RB set 0 and RB set 1), the first UE may communicate with the second UE using the sidelink sub-channel 1, including resources in sidelink sub-channel 1 that overlap the intra-cell guard band 802. In some cases, whether the first UE may use the sub-channel 1 for communicating with the second UE may depend on a capability of at least one of the first UE or the second UE. For example, in some cases, if the second UE is a high-capability UE (e.g., a UE that is able to receive in intra-cell guard bands), the first UE may use sidelink sub-channel 1, including resources in sidelink sub-channel 1 that overlap the intra-cell guard band 802, to communicate with the second UE (e.g., my transmit information to the second UE in the intra-cell guard band 802). For example, in some cases, the first UE may use resources in sidelink sub-channel 1 that overlap the intra-cell guard band 802 for transmitting a physical sidelink shared channel (PSSCH). If, however, the second UE is a low-capability UE (e.g., a UE that is notable to receive in intra-cell guard bands), the first UE may not use sidelink sub-channel 1 for communicating with the second UE.

However, while this mapping may allow high-capability UEs to use sidelink sub-channels that overlap intra-cell guard bands, a general problem with this mapping is that different sub-channels may have different probability to be used due to the LBT dependencies described above. For example, if the UE wants to use a single sidelink sub-channel, some sidelink sub-channels are more difficult to use than other sub-channels, due to higher LBT requirements. For example, as described above, sidelink sub-channel 0 may be easier for the first UE to use as compared to, for example, sidelink sub-channel 1 since sidelink sub-channel 1 requires that the LBT procedure pass in RB set 0 and RB set 1 as compared to sidelink sub-channel 0 that only requires the LBT procedure to pass in RB set 0.

Another issue that may exist with the mapping illustrated in FIG. 8 may be that if there is a sidelink sub-channel that partially overlaps with intra-cell guard band (e.g., 802), the sidelink sub-channel may not be used by low capability UEs, as described above. This issue is especially problematic as, currently, only consecutive sidelink sub-channels may be allocated in one physical sidelink shared channel (PSSCH). Thus, because sidelink sub-channels that overlap an intra-cell guard band are unavailable for low-capability UEs, an available size of the PSSCH may be limited, reducing throughput for these UEs.

In some cases, to help alleviate these issues with low-capability UEs, puncturing may be introduced to remove resources (e.g., RBs) from sidelink sub-channels that overlap with an intra-cell guard band. For example, as illustrated in FIG. 9, puncturing of certain sidelink sub-channels that overlap with an intra-cell guard band may result in a second mapping between the sidelink sub-channels and RB sets of the unlicensed spectrum in which the sidelink sub-channels are mapped continuously across the plurality of RB sets but not the plurality of intra-cell guard bands 902 in the unlicensed spectrum.

Figure 9:
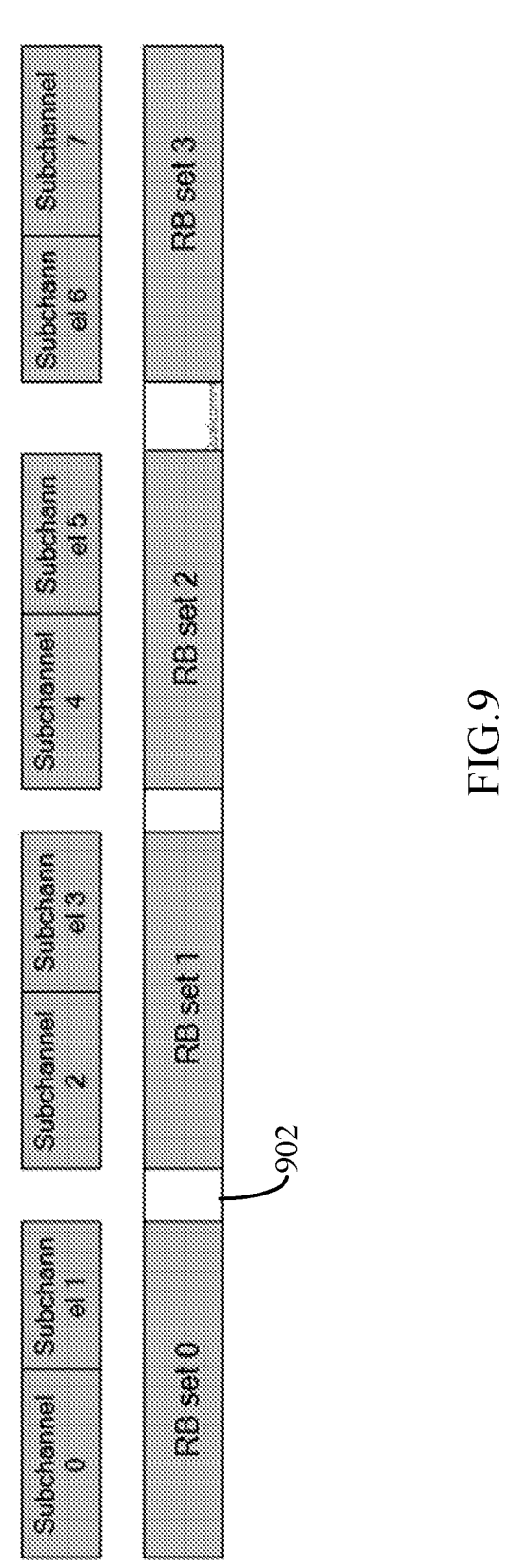
FIG. 9 illustrates a second mapping of sidelink sub-channels to resource block (RB) sets of an unlicensed spectrum, in accordance with certain aspects of the present disclosure.

For example, as illustrated in FIG. 9, sidelink sub-channel 0 and sidelink sub-channel 1 may be mapped consecutively to RB set 0 of the unlicensed spectrum. However, with reference to FIG. 8, since sidelink sub-channel 1 may include resources (RBs) that would overlap with an intra-cell guard band, these resources may be punctured, as illustrated in FIG. 9. Accordingly, due to the puncturing, sidelink sub-channel 1 may occupy less bandwidth than the sidelink sub-channel 0. Further, in some cases, an amount of bandwidth occupied by each of the sidelink sub-channels may be based on a relative frequency location of the corresponding sidelink sub-channel with respect to the plurality of guard bands. For example, in some cases, if sidelink sub-channel 1 begins closer to the intra-cell guard band 902, a bandwidth of sidelink sub-channel 1 may be reduced as there may be a reduced number of RBs between the start of sidelink sub-channel 1 and the start of the intra-cell guard band 902.

In both the first mapping illustrated in FIG. 8 and the second mapping illustrated in FIG. 9, continuous allocation of sub-channels for PSSCH may still be possible. For example, for low-capability UEs, the intra-cell guard band (e.g., 802, 902) may not be used (e.g., PSSCH rate matches around) but resources within continuous sidelink sub-channels overlapping an RB set of the unlicensed spectrum may be used for PSSCH transmission. For high capability UEs, the intra-cell guard band (e.g., 802, 902) may be used for PSSCH transmission as well (e.g., PSSCH rate matches into) if the RB sets on either side intra-cell guard band are allocated (e.g., pass an LBT procedure).

Further, for the first mapping illustrated in FIG. 8 and the second mapping illustrated in FIG. 9, different options exist for placement of PSCCH. For example, in some cases, PSCCH may be placed within a sidelink sub-channel, similar to a legacy approach, in RBs at the beginning of a sidelink sub-channel with puncturing. In other cases, PSCCH may be placed in sidelink sub-channels starting from the beginning RBs of the sidelink sub-channel, but with rate matching around the intra-cell guard band. Additionally, in other cases, if the amount resources available for PSCCH within a particular sidelink sub-channel is too small (e.g., lower than a threshold), this sidelink sub-channel may not carry PSCCH. For example, with reference to FIG. 9, if the amount of resources in sidelink sub-channel 1 is below a threshold, the sidelink sub-channel 1 may not carry a physical sidelink control channel (PSCCH). However, in some cases, sidelink sub-channel 1 may still be used to carry a PSSCH.

According to aspects, since the sidelink sub-channel 0 and sidelink sub-channel 1 are confined to the same RB set (e.g., RB set 0), a UE (e.g., the first UE described above) wishing to communicate using sidelink sub-channel 0 and sidelink sub-channel 1 may only need to perform a LBT procedure across one RB set (e.g., RB set 0), as opposed to two RB sets like the first mapping illustrated in FIG. 8.

Figure 10:
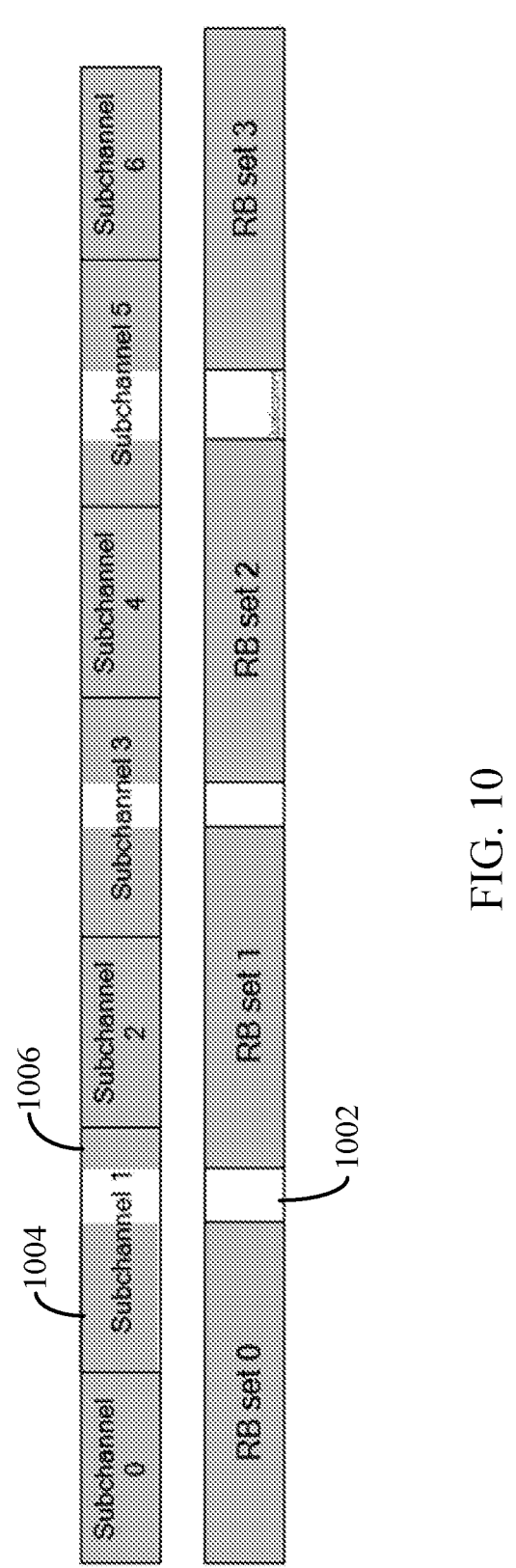
FIG. 10 illustrates a third mapping of sidelink sub-channels to resource block (RB) sets of an unlicensed spectrum, in accordance with certain aspects of the present disclosure.

FIG. 10 illustrates a third mapping (e.g., that may be used by a first UE when communicating with a second UE) in which certain sidelink sub-channels may be rate matched around intra-cell guard bands of the unlicensed spectrum. For example, as illustrated in FIG. 10, the third mapping between the sidelink sub-channels and RB sets of the unlicensed spectrum comprises the sidelink sub-channels being mapped continuously across the plurality of RB sets and not the plurality of guard bands in the unlicensed spectrum. For example, as shown, sidelink sub-channel 0 and sidelink sub-channel 1 may be mapped continuously to RB set 0 of the unlicensed spectrum. Additionally, as illustrated in FIG. 10, sidelink sub-channel 1 may also be mapped to RB set 1 by rate matching sidelink sub-channel 1 around the intra-cell guard band 1002 disposed between RB set 0 and RB set 1. Due to the rate matching around intra-cell guard band 1002, the RBs included in sidelink sub-channel 1 may be discontinuous (e.g., in two segments/ portion)

For example, as illustrated, a first portion 1004 of sidelink sub-channel 1 may be included within RB set 0 of the unlicensed spectrum while a second portion 1006 of the sidelink sub-channel 1 may be included within RB set 1 of the unlicensed spectrum. Unlink the second mapping illustrated in FIG. 9, under the third mapping illustrated in FIG. 10, a size of the continuous sidelink sub-channels 0 and 1 may be equal. For example, as illustrated, a bandwidth of the sidelink sub-channel 0 is equal to a sum of a bandwidth of the first portion 1004 of sidelink sub-channel 1 and a bandwidth of the second portion 1006 of sidelink sub-channel 1.

Further, with respect to the third mapping in FIG. 10, when transmitting a PSCCH in sidelink sub-channel 1, the PSCCH may be rate matched around the intra-cell guard band 1002. Additionally, in some cases, a PSSCH transmitted in sidelink sub-channel 1 may be one of rate matched into the intra-cell guard band 1002 disposed between RB set 0 and RB set 1 or rate matched around the intra-cell guard band 1002 based on at least one of a capability of the first UE or a capability of the second UE. For example, in some cases, if the second UE is low-capability (e.g., not able to receive transmissions in intra-cell guard periods), then the PSSCH transmitted by the first UE may be rate matched around the intra-cell guard band 1002 (e.g., not transmitted using RBs in the intra-cell guard band 1002). In other words, if the second UE is a low-capability UE, the first UE may refrain from communicating with the second UE using the intra-cell guard band 1002 disposed between RB set 0 and RB set 1. However, if the second UE is high-capability (e.g., able to receive transmissions in intra-cell guard periods), then the PSSCH transmitted by the first UE may be rate matched into the intra-cell guard band 1002 (e.g., transmitted using RBs in the intra-cell guard band 1002). That is, if the second UE is high-capability, the first UE may communicate with the second UE using the intra-cell guard band 1002 disposed between RB set 0 and RB set 1.

According to aspects, communicating with the second UE using the sidelink sub-channel 1 that is rate matched into or around the intra-cell guard band 1002 may require that a LBT procedure pass for RB set 0 and RB set 1 on either side of the intra-cell guard band 1002. For example, communicating with the second UE via the connection using the sidelink sub-channel 1 may include performing an LBT procedure across RB set 0 and RB set 1 to determine whether resources in the RB set 0 and resources in the RB set 1 are available for use. The first UE may then communicate with the second UE using sidelink sub-channel 1 spanning RB set 0 and RB set 1 when, based on the LBT procedure, the resources in the RB set 0 are available for use and the resources in the RB set 1 are available for use.

Figure 11:
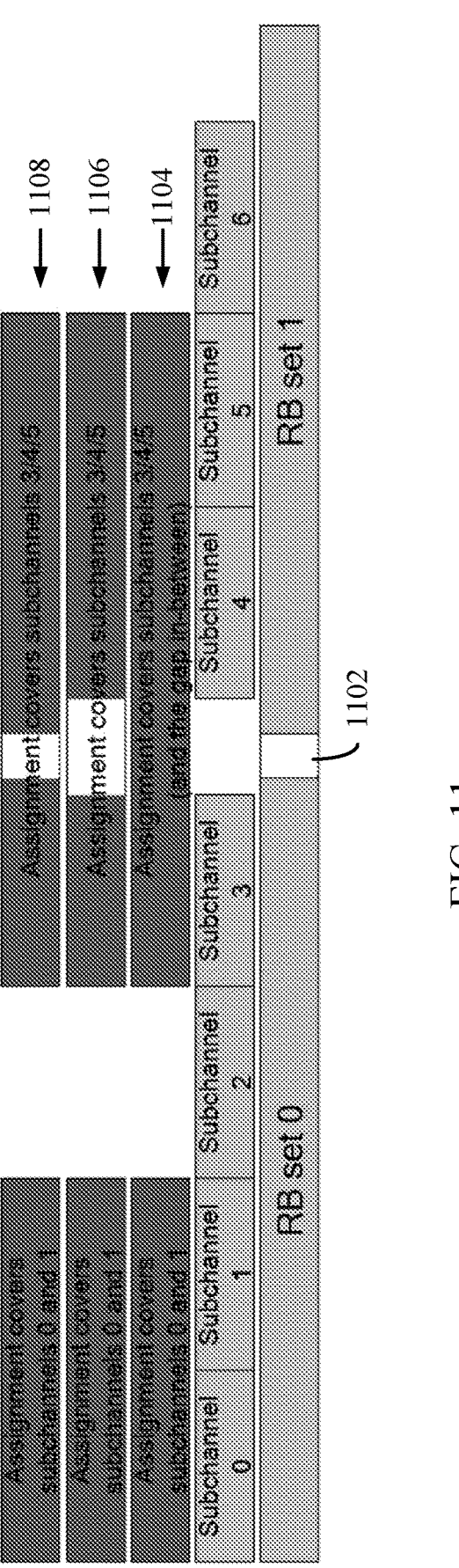
FIG. 11 illustrates a fourth mapping of sidelink sub-channels to resource block (RB) sets of an unlicensed spectrum, in accordance with certain aspects of the present disclosure.

FIG. 11 illustrates a fourth mapping (e.g., that may be used by a first UE when communicating with a second UE) in which sidelink sub-channels may be confined to fit within a particular RB set. More specifically, in some cases, the fourth mapping between the sidelink sub-channels and the RB sets of the unlicensed spectrum may comprise each of the sidelink sub-channels being fully confined within a corresponding RB set of the plurality of RB sets such that no sidelink sub-channel spans a guard band disposed between two RB set of the plurality of RB sets.

As illustrated in FIG. 11, a first set of sidelink sub-channels (e.g., sidelink sub-channels 0-3) may be mapped to and confined within RB set 0 of the unlicensed spectrum while a second set of sidelink sub-channels (e.g., sidelink sub-channels 4-6) may be mapped to and confined within RB set 1 of the unlicensed spectrum. As shown, while confining the sidelink sub-channels to fit within RB sets of the unlicensed spectrum may avoid issues with sidelink sub-channels overlapping intra-cell guard bands described above, the resources defined within the intra-cell guard bands may be wasted since no sidelink sub-channels overlap these resources. Therefore, to solve the problem that the RBs in the intra-cell guard bands are not included in any sidelink sub-channels, in some cases, for high-capability UEs, the RBs between two adjacent sidelink sub-channels (e.g., including resources in an intra-cell guard band) may be included in an assignment of resources if both sidelink sub-channels are included in the assignment. In other words, the RBs between two sub-channels that overlap the intra-cell guard band may be interpreted as a special sidelink sub-channel included within the resource assignment. However, in such cases, his special sidelink sub-channel may not include a PSCCH.

For example, as illustrated in FIG. 11, sidelink sub-channel 3 may be confined within RB set 0 of the unlicensed spectrum and sidelink sub-channel 4 may be confined within RB set 1 of the unlicensed spectrum. As shown, RB set 0 is disposed consecutively (e.g., adjacent) to RB set 1 and sidelink sub-channel 3 is disposed consecutively (e.g., adjacent) to the sidelink sub-channel 4 but separated from the second sidelink sub-channel by at least an intra-cell guard band 1102. In some cases, as shown at 1104, the first UE may receive an assignment of resources for communicating with the second UE that includes resources disposed between sidelink sub-channel 3 and sidelink sub-channel 4. In some cases, the resources disposed between sidelink sub-channel 3 and sidelink sub-channel 4 may include resources (e.g., RBs) in the intra-cell guard band 1102 and resources (e.g., RBs) in sidelink sub-channel 3 and side-link sub-channel 4.

Accordingly, in this case, the first UE may communicate with the second UE via the resources disposed between the first sidelink sub-channel and the second sidelink sub-channel based on at least one of a capability of the first UE or the second UE. For example, in some cases, if the second UE is high-capability, the first UE may use all of the resources disposed between sidelink sub-channel 3 and sidelink sub-channel 4, including resources in the intra-cell guard band 1102, to communicate with the second UE. Such communication may also be conditioned on a passing LBT procedure in both of RB set 0 and RB set 1.

In some cases, as shown at 1106, if the second UE is low-capability, the first UE may receive an assignment that includes a set of resources within sidelink sub-channel 3 and sidelink sub-channel 4 but that excludes resources disposed between sidelink sub-channel 3 and sidelink sub-channel 4. In this case, the first UE may only use the resources included within sidelink sub-channel 3 and sidelink sub-channel 4 to communicate with the second UE.

In some cases, as shown at 1108, if the second UE is low-capability, the first UE may receive an assignment that includes resources included within sidelink sub-channel 3 and sidelink sub-channel 4 as well as a set of resources disposed between sidelink sub-channel 3 and sidelink sub-channel 4 that are within RB sets 0 and 1. However, in this case, the assignment may not include resources in the intra-cell guard band 1102. Accordingly, in this case, the first UE may use the resources included within sidelink sub-channel 3 and sidelink sub-channel 4 as well as resources disposed between sidelink sub-channel 3 and sidelink sub-channel 4 (not including resources within the intra-cell guard band 1102) for communicating with the second UE.

Figure 12:
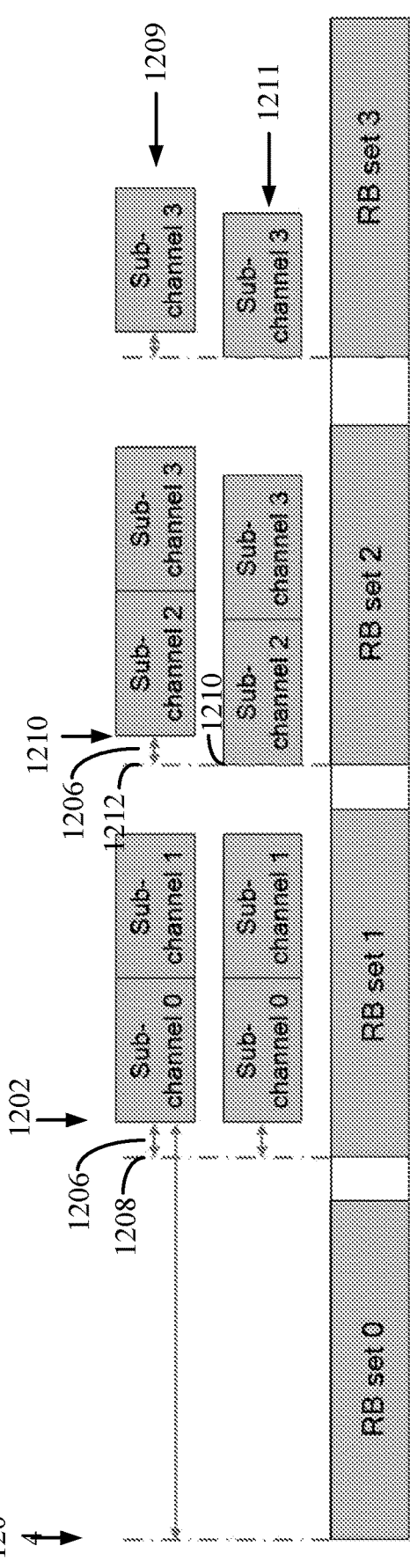
FIG. 12 illustrates an example resource pool configuration for sidelink sub-channels mapped to RB set of an unlicensed spectrum, in accordance with certain aspects of the present disclosure.

In some cases, a resource pool for sidelink sub-channels for the fourth mapping illustrated in FIG. 11 may be defined in different manners, as shown in FIG. 12. For example, as shown in FIG. 12, a first set of sidelink sub-channels may confined within RB set 1 of the unlicensed spectrum and a second set of sidelink sub-channels may be confined within RB set 2 of the unlicensed spectrum. As shown, the first set of sidelink sub-channels may include, for example, sidelink sub-channel 0 and the second set of sidelink sub-channels may include, for example, sidelink sub-channel 2.

In some cases, in a first option for defining the resource pool for sidelink sub-channels for the mapping illustrated in FIG. 11, a first RB 1202 in frequency of the sidelink sub-channel 0 may be defined with respect to a lowest indexed RB 1204 of a sidelink bandwidth part. Additionally, the first RB 1202 in frequency of sidelink sub-channel 0 may start at first offset 1206 in frequency from a start 1208 of the RB set 1 of the unlicensed spectrum. In some cases, a sub-channel size (S) may be used to place sidelink sub-channels continuously in RB set 1 (e.g., sidelink sub-channels 0-1). According to aspects, when the sidelink sub-channels exceed a higher end of RB set 1, the sidelink sub-channels may move to the next RB set, such as RB set 2. When adding sidelink sub-channels to the next RB set, in some cases, as illustrated at 1209, a first RB 1210 in frequency of the sidelink sub-channel 2 may start the first offset 1206 from a start 1212 of RB set 2. In other cases, as illustrated at 1211, the first RB 1210 in frequency of the sidelink sub-channel 2 may be aligned with the start 1212 of the RB set 2 of the unlicensed spectrum. According to aspects, sidelink sub-channels may be continually added until the number of sidelink sub-channels needed for transmission is reached. In some cases, left over RBs in an RB set may be assigned/aggregated to the last sidelink sub-channel in the RB set to avoid waste.

In some cases, in a second option for defining the resource pool for sidelink sub-channels for the mapping illustrated in FIG. 11, the starting RB and number of sidelink sub-channels may be defined with respect to one RB set and a RB set index set/range may be provided to indicate the RB sets the sidelink sub-channels are mapped on. For example, the RB set/range (e.g., starting RB set and number of RB set) may indicate which RB sets will have sidelink sub-channels configured. Within each RB set with sidelink sub-channels configured, the starting RB indicates the starting RB of the lowest indexed sidelink sub-channel in the RB set with respect to the lowest indexed RB in the RB set. Additionally, the number of sidelink sub-channels may be defined with respect to the RB set. Accordingly, a total number of sidelink sub-channels may be determined as the number of sidelink sub-channels in an RB set times the number of RB sets with sidelink sub-channels configured.

Figure 13:
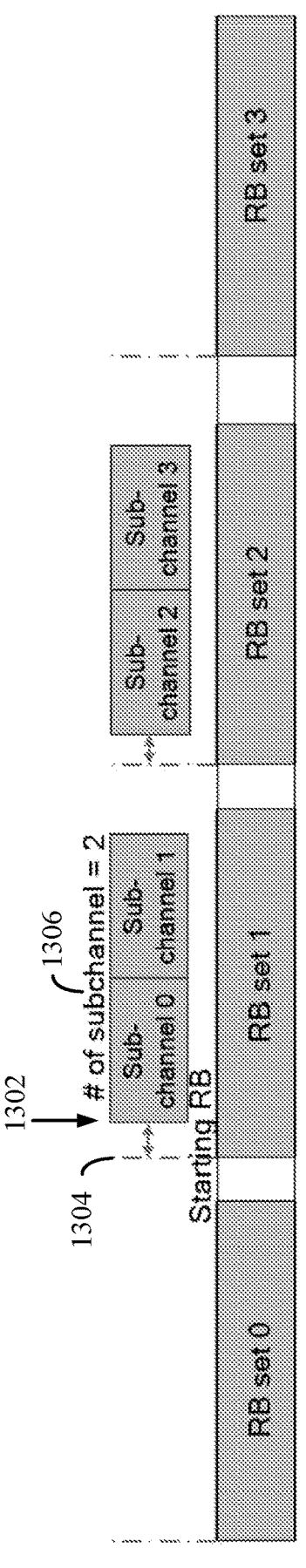
FIG. 13 illustrates another example resource pool configuration for sidelink sub-channels mapped to RB set of an unlicensed spectrum, in accordance with certain aspects of the present disclosure.

For example, in some cases, as illustrated in FIG. 13, a first RB 1302 in frequency of the sidelink sub-channel 0 may be defined with respect to a lowest indexed RB 1304 of the RB set 1 of the unlicensed spectrum. In some cases, the first UE may receive an indication of a starting RB index, indicating the first RB in frequency of the first sidelink sub-channel. The UE may also receive an indication of a RB set range, indicating the RB sets of the unlicensed spectrum with configured sidelink sub-channels as well as an indication of a number of sidelink sub-channels 1306 confined within each RB set. Accordingly, based on the starting RB index, the RB set range, and the number of sidelink sub-channels, the UE may determine a resource pool for the sidelink sub-channels, spanning the RB sets indicated by the RB set range. The first UE may then communicate with the second UE based, at least in part, on the starting RB index, the indicated number of sidelink sub-channels confined within each RB set, and the RB set range.

FIG. 14 is a flow diagram illustrating example operations 1400 for wireless communication, for example, for communicating using sidelink resources allocated in an unlicensed spectrum, in accordance with certain aspects of the present disclosure. The operations 1400 may be performed, for example, by a first UE (e.g., the UE 120a in the wireless communication network 100). The operations 1400 may be implemented as software components that are executed and run on one or more processors (e.g., controller/processor 280 of FIG. 2). Further, the transmission and reception of signals by the UE in operations 1400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1400 may begin, at block 1402, by establishing a connection with a second UE for sidelink communication in an unlicensed spectrum.

Operations 1400 may continue, at block 1404, by communicating with (e.g., transmitting to) the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

In some cases, the mapping between the sidelink sub-channels and RB sets of the unlicensed spectrum comprises multiple sidelink sub-channels being mapped to at least one RB set of the plurality of RB sets.

In some cases, the mapping between the sidelink sub-channels and RB sets of the unlicensed spectrum comprises the sidelink sub-channels being mapped continuously across the plurality of RB sets and the one or more guard bands in the unlicensed spectrum. Further, in some cases, a first sidelink sub-channel spans at least first RB set of the unlicensed spectrum and a first guard band disposed between the first RB set and a second RB set. Further, in some cases, communicating, at 1404, with the second UE via the connection using the one or more sidelink sub-channels may include performing a listen before talk (LBT) procedure across the first RB set and the second RB set to determine whether resources in the first RB set and resources in the second RB set are available for use. Accordingly, in such cases, the first UE may communicate with the second UE using the first sidelink sub-channel spanning the first RB set and the second RB set when, based on the LBT procedure, the resources in the first RB set are available for use and the resources in the second RB set are available for use.

In some cases, communicating, at 1404, with the second UE using the first sidelink sub-channel further comprises communicating with the second UE using the guard band disposed between the first RB set and the second RB set based on a capability of at least one of the first UE or the second UE. In some cases, communicating, at 1404, with the second UE using the first sidelink sub-channel comprises refraining from communicating with the second UE using the guard band disposed between the first RB set and the second RB set based on a capability of at least one of the first UE or the second UE.

In some cases, the mapping between the sidelink sub-channels and RB sets of the unlicensed spectrum comprises the sidelink sub-channels being mapped continuously across the plurality of RB sets and not the one or more guard bands in the unlicensed spectrum. In this case, a first sidelink sub-channel of the one or more sidelink sub-channels and a second sidelink sub-channel of the one or more sidelink sub-channels may map to a first RB set of the unlicensed spectrum. In some cases, the second sidelink sub-channel occupies less bandwidth than the first sidelink sub-channel. In some cases, wherein the second sidelink sub-channel does not include a physical sidelink control channel (PSCCH) based on an amount of resources in the second sidelink sub-channel available for use being below a threshold. In some cases, an amount of bandwidth occupied by each of the sidelink sub-channels may be based on a relative frequency location of the corresponding sidelink sub-channel with respect to the one or more guard bands.

In some cases, a first portion of the second sidelink sub-channel is included within the first RB set of the unlicensed spectrum, a second portion of the second sidelink sub-channel is included within a second RB set of the unlicensed spectrum, and a guard band of the one or more guard bands is disposed between the first RB set and the second RB set. In some cases, a bandwidth of the first sidelink sub-channel is equal to a sum of a bandwidth of the first portion of the second sidelink sub-channel and a bandwidth of the second portion of the second sidelink sub-channel. In some cases, a physical sidelink control channel (PSCCH) in the second sidelink sub-channel is rate matched around the guard band and a physical sidelink shared channel (PSSCH) in the second sidelink sub-channel is one of rate matched into the guard band or rate matched around the guard band based on at least one of a capability of the first UE or a capability of the second UE.

In some cases, communicating, at 1404, with the second UE via the connection using the one or more sidelink sub-channels may comprise performing a listen before talk (LBT) procedure across a first RB set and a second RB set to determine whether resources in the first RB set and resources in the second RB set are available for use. Accordingly, at 1404, the first UE may communicate with the second UE using at least one of the one or more sidelink sub-channels spanning the first RB set and the second RB set when, based on the LBT procedure, the resources in the first RB set are available for use and the resources in the second RB set are available for use.

In some cases, communicating, at 1404, with the second UE using the at least one of the one or more sidelink sub-channels further comprises communicating with the second UE using a guard band disposed between the first RB set and the second RB set based on a capability of at least one of the first UE or the second UE. In some cases, communicating, at 1404, with the second UE using the at least one of the sidelink sub-channels comprises refraining from communicating with the second UE using a guard band disposed between the first RB set and the second RB set based on a capability of at least one of the first UE or the second UE.

In some cases, the mapping between the sidelink sub-channels and the RB sets of the unlicensed spectrum comprises each of the sidelink sub-channels being fully confined within a corresponding RB set of the plurality of RB sets such that no sidelink sub-channel spans a guard band disposed between two RB set of the plurality of RB sets. For example, in this case, the one or more sidelink sub-channels may comprise a first sidelink sub-channel confined within a first RB set of the unlicensed spectrum and a second sidelink sub-channel confined within a second RB set of the unlicensed spectrum. Additionally, in some cases, the first RB set may be disposed adjacent to the second RB set and the first sidelink sub-channel is disposed adjacent to the second sidelink sub-channel but separated from the second sidelink sub-channel by at least a guard band.

Additionally, in some cases, operations 1400 may further include receiving an assignment of resources (e.g., from a third UE that performed an LBT procedure and assigns resources to the first UE) for communicating with the second UE, wherein the assignment of resources includes resources disposed between the first sidelink sub-channel and the second sidelink sub-channel, including resources in the guard band, and resources in the first sidelink sub-channel and the second side-link sub-channel. In some cases, operations 1400 include the first UE transmitting (e.g., in a PSSCH) an assignment of resources (e.g., obtained by the first UE by performing an LBT procedure) for communicating with the second UE, wherein the assignment of resources includes resources disposed between the first sidelink sub-channel and the second sidelink sub-channel, including resources in the guard band, and resources in the first sidelink sub-channel and the second side-link sub-channel. Accordingly, in this case, communicating, at 1404, with the second UE via the connection comprises communicating via the resources disposed between the first sidelink sub-channel and the second sidelink sub-channel based on at least one of a capability of the first UE or the second UE.

In some cases, operations 1400 may further include receiving an assignment of resources (e.g., from a third UE that performed an LBT procedure and assigns resources to the first UE) for communicating with the second UE, wherein the assignment of resources includes a set of resources within the first sidelink sub-channel and the second sidelink sub-channel and excludes resources disposed between the first sidelink sub-channel and the second side-link sub-channel. In some cases, operations 1400 include the first UE transmitting (e.g., in a PSSCH) an assignment of resources (e.g., obtained by the first UE by performing an LBT procedure) for communicating with the second UE, wherein the assignment of resources includes a set of resources within the first sidelink sub-channel and the second sidelink sub-channel and excludes resources disposed between the first sidelink sub-channel and the second side-link sub-channel.

In some cases, operations 1400 may further include receiving (e.g., from a third UE that performed an LBT procedure and assigns resources to the first UE) an assignment of resources for communicating with the second UE, wherein the assignment of resources includes a set of resources disposed between the first sidelink sub-channel and the second sidelink sub-channel, not including resources in the guard band, and resources in the first sidelink sub-channel and the second side-link sub-channel. In some cases, operations 1400 include the first UE transmitting (e.g., in a PSSCH) an assignment of resources (e.g., obtained by the first UE by performing an LBT procedure) for communicating with the second UE, wherein the assignment of resources includes a set of resources disposed between the first sidelink sub-channel and the second sidelink sub-channel, not including resources in the guard band, and resources in the first sidelink sub-channel and the second side-link sub-channel.

In some cases, the one or more sidelink sub-channels comprise at least a first set of sidelink sub-channels confined within a first RB set of the unlicensed spectrum and a second set of sidelink sub-channels confined within a second RB set of the unlicensed spectrum. In some cases, the first set of sidelink sub-channels comprises at least a first sidelink sub-channel and the second set of sidelink sub-channels comprises at least a second sidelink sub-channel. In some cases, a first RB in frequency of the first sidelink sub-channel is defined with respect to a lowest indexed RB of a sidelink bandwidth part. In some cases, the first RB in frequency of the first sidelink sub-channel starts at first offset in frequency from a start of the first RB set of the unlicensed spectrum. In some cases, a first RB in frequency of the second sidelink sub-channel starts the first offset from a start of the second RB set. In some cases, a first RB in frequency of the second sidelink sub-channel is aligned with a start of the second RB set of the unlicensed spectrum.

Figure 15:
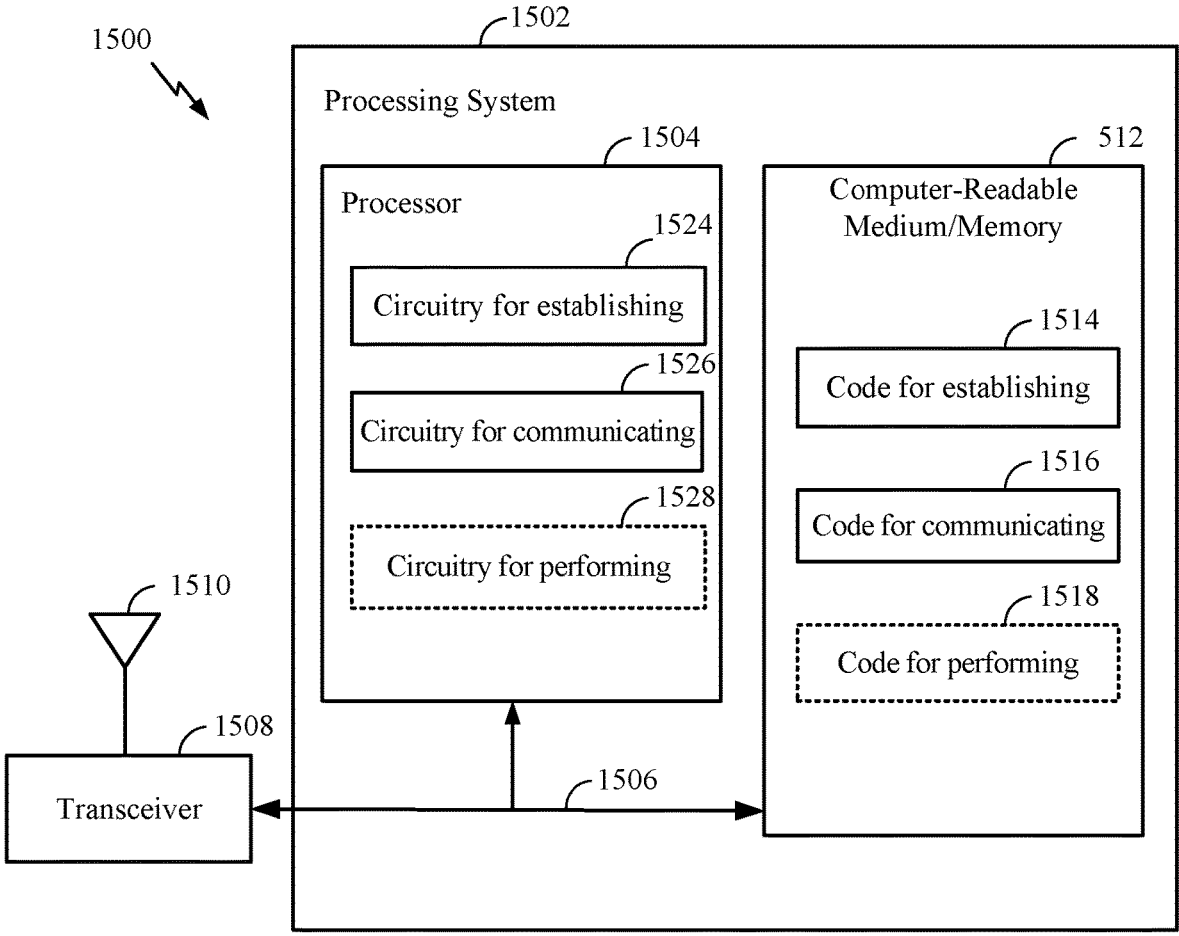
FIG. 15 illustrates a communications device that may include various components configured to perform operations for the techniques disclosed herein in accordance with aspects of the present disclosure.

In some cases, a first RB in frequency of the first sidelink sub-channel is defined with respect to a lowest indexed RB of the first RB set of the unlicensed spectrum. In this case, operations 1400 may further include receiving or transmitting an indication of a starting RB index, indicating the first RB in frequency of the first sidelink sub-channel and receiving or transmitting an indication of a number of sidelink sub-channels included within at least the first set of sidelink sub-channels confined within the first RB set of the unlicensed spectrum. Accordingly, in this case, communicating, at 1404, with the second UE may be based, at least in part, on the starting RB index and the number of sidelink sub-channels included within at least the first set of sidelink sub-channels confined within the first RB set of the unlicensed spectrum FIG. 15 illustrates a communications device 1500 that may include various components (e.g., corresponding to means-plus-function components) configured to perform operations for the techniques disclosed herein, such as the operations illustrated in FIG. 14. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 14, or other operations for performing the various techniques discussed herein for communicating using sidelink resources allocated in unlicensed spectrum. In certain aspects, computer-readable medium/memory 1512 stores code 1514 for establishing, code 1516 for communicating, and code 1518 for performing.

In some cases, the code 1514 for establishing may include code for establishing a connection with a second UE for sidelink communication in an unlicensed spectrum.

In some cases, the code 1516 for communicating may include code for communicating with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

In some cases, the code 1518 for performing may include code for performing a listen before talk (LBT) procedure across the first RB set and the second RB set to determine whether resources in the first RB set and resources in the second RB set are available for use.

In some cases, the code 1516 for communicating may include code for communicating with the second UE using the first sidelink sub-channel spanning the first RB set and the second RB set when, based on the LBT procedure, the resources in the first RB set are available for use and the resources in the second RB set are available for use.

In some cases, the code 1516 for communicating may include code for communicating with the second UE using the guard band disposed between the first RB set and the second RB set based on a capability of at least one of the first UE or the second UE.

In some cases, the code 1516 for communicating may include code for communicating with the second UE using the guard band disposed between the first RB set and the second RB set based on a capability of at least one of the first UE or the second UE.

In some cases, the code 1518 for performing may include code for performing a listen before talk (LBT) procedure across a first RB set and a second RB set to determine whether resources in the first RB set and resources in the second RB set are available for use.

In some cases, the code 1516 for communicating may include code for communicating with the second UE using at least one of the one or more sidelink sub-channels spanning the first RB set and the second RB set when, based on the LBT procedure, the resources in the first RB set are available for use and the resources in the second RB set are available for use.

In some cases, the code 1516 for communicating may include code for communicating with the second UE using a guard band disposed between the first RB set and the second RB set based on a capability of at least one of the first UE or the second UE.

In some cases, the code 1516 for communicating may include code for refraining from communicating with the second UE using a guard band disposed between the first RB set and the second RB set based on a capability of at least one of the first UE or the second UE.

In some cases, the code 1516 for communicating may include code for communicating an assignment of resources for communicating with the second UE, wherein the assignment of resources includes resources disposed between the first sidelink sub-channel and the second sidelink sub-channel, including resources in the guard band, and resources in the first sidelink sub-channel and the second side-link sub-channel.

In some cases, the code 1516 for communicating may include code for communicating via the resources disposed between the first sidelink sub-channel and the second side-link sub-channel based on at least one of a capability of the first UE or the second UE.

In some cases, the code 1516 for communicating may include code for communicating an assignment of resources for communicating with the second UE, wherein the assignment of resources includes a set of resources within the first sidelink sub-channel and the second sidelink sub-channel and excludes resources disposed between the first sidelink sub-channel and the second sidelink sub-channel.

In some cases, the code 1516 for communicating may include code for communicating an assignment of resources for communicating with the second UE, wherein the assignment of resources includes a set of resources disposed between the first sidelink sub-channel and the second side-link sub-channel, not including resources in the guard band, and resources in the first sidelink sub-channel and the second side-link sub-channel.

In some cases, the code 1516 for communicating may include code for communicating an indication of a starting RB index, indicating the first RB in frequency of the first sidelink sub-channel. Additionally, in some cases, the code 1516 for communicating may include code for communicating an indication of a number of sidelink sub-channels included within at least the first set of sidelink sub-channels confined within the first RB set of the unlicensed spectrum.

In certain aspects, the processor 1504 may include circuitry configured to implement the code stored in the computer-readable medium/memory 1512, such as for performing the operations illustrated in FIG. 14, or other operations for performing the various techniques discussed herein for communicating using sidelink resources allocated in unlicensed spectrum. For example, the processor 1504 includes circuitry 1524 for establishing, circuitry 1526 for communicating, and circuitry 1528 for performing.

In some cases, the circuitry 1524 for establishing may include circuitry for establishing a connection with a second UE for sidelink communication in an unlicensed spectrum.

In some cases, the circuitry 1526 for communicating may include circuitry for communicating with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

In some cases, the circuitry 1528 for performing may include circuitry for performing a listen before talk (LBT) procedure across the first RB set and the second RB set to determine whether resources in the first RB set and resources in the second RB set are available for use.

In some cases, the circuitry 1526 for communicating may include circuitry for communicating with the second UE using the first sidelink sub-channel spanning the first RB set and the second RB set when, based on the LBT procedure, the resources in the first RB set are available for use and the resources in the second RB set are available for use.

In some cases, the circuitry 1526 for communicating may include circuitry for communicating with the second UE using the guard band disposed between the first RB set and the second RB set based on a capability of at least one of the first UE or the second UE.

In some cases, the circuitry 1526 for communicating may include circuitry for communicating with the second UE using the guard band disposed between the first RB set and the second RB set based on a capability of at least one of the first UE or the second UE.

In some cases, the circuitry 1528 for performing may include circuitry for performing a listen before talk (LBT) procedure across a first RB set and a second RB set to determine whether resources in the first RB set and resources in the second RB set are available for use.

In some cases, the circuitry 1526 for communicating may include circuitry for communicating with the second UE using at least one of the one or more sidelink sub-channels spanning the first RB set and the second RB set when, based on the LBT procedure, the resources in the first RB set are available for use and the resources in the second RB set are available for use.

In some cases, the circuitry 1526 for communicating may include circuitry for communicating with the second UE using a guard band disposed between the first RB set and the second RB set based on a capability of at least one of the first UE or the second UE.

In some cases, the circuitry 1526 for communicating may include circuitry for refraining from communicating with the second UE using a guard band disposed between the first RB set and the second RB set based on a capability of at least one of the first UE or the second UE.

In some cases, the circuitry 1526 for communicating may include circuitry for communicating an assignment of resources for communicating with the second UE, wherein the assignment of resources includes resources disposed between the first sidelink sub-channel and the second side-link sub-channel, including resources in the guard band, and resources in the first sidelink sub-channel and the second side-link sub-channel.

In some cases, the circuitry 1526 for communicating may include circuitry for communicating via the resources disposed between the first sidelink sub-channel and the second sidelink sub-channel based on at least one of a capability of the first UE or the second UE.

In some cases, the circuitry 1526 for communicating may include circuitry for communicating an assignment of resources for communicating with the second UE, wherein the assignment of resources includes a set of resources within the first sidelink sub-channel and the second sidelink sub-channel and excludes resources disposed between the first sidelink sub-channel and the second sidelink sub-channel.

In some cases, the circuitry 1526 for communicating may include circuitry for communicating an assignment of resources for communicating with the second UE, wherein the assignment of resources includes a set of resources disposed between the first sidelink sub-channel and the second sidelink sub-channel, not including resources in the guard band, and resources in the first sidelink sub-channel and the second side-link sub-channel.

In some cases, the circuitry 1526 for communicating may include circuitry for communicating an indication of a starting RB index, indicating the first RB in frequency of the first sidelink sub-channel. Additionally, in some cases, the circuitry 1526 for communicating may include circuitry for communicating an indication of a number of sidelink sub-channels included within at least the first set of sidelink sub-channels confined within the first RB set of the unlicensed spectrum.

Example Aspects

Aspect 1: A method of wireless communication by a user equipment (UE), comprising: establishing a connection with a second UE for sidelink communication in an unlicensed spectrum and communicating with the second UE via the connection using one or more sidelink sub-channels in the unlicensed spectrum according to a mapping between sidelink sub-channels and resource block (RB) sets of the unlicensed spectrum, wherein the unlicensed spectrum comprises a plurality of RB sets and one or more guard bands disposed between RB sets in the plurality RB sets.

Aspect 2: The method of Aspect 1, wherein the mapping between the sidelink sub-channels and RB sets of the unlicensed spectrum comprises multiple sidelink sub-channels being mapped to at least one RB set of the plurality of RB sets.

Aspect 3: The method of one or more of Aspect 1 or Aspect 2, wherein the mapping between the sidelink sub-channels and RB sets of the unlicensed spectrum comprises the sidelink sub-channels being mapped continuously across the plurality of RB sets and the one or more guard bands in the unlicensed spectrum.

Aspect 4: The method of Aspect 3, wherein a first sidelink sub-channel spans at least first RB set of the unlicensed spectrum and a first guard band disposed between the first RB set and a second RB set.

Aspect 5: The method of Aspect 4, wherein communicating with the second UE via the connection using the one or more sidelink sub-channels comprises: performing a listen before talk (LBT) procedure across the first RB set and the second RB set to determine whether resources in the first RB set and resources in the second RB set are available for use and communicating with the second UE using the first sidelink sub-channel spanning the first RB set and the second RB set when, based on the LBT procedure, the resources in the first RB set are available for use and the resources in the second RB set are available for use.

Aspect 6: The method of Aspect 5, wherein communicating with the second UE using the first sidelink sub-channel further comprises communicating with the second UE using the guard band disposed between the first RB set and the second RB set based on a capability of at least one of the first UE or the second UE.

Aspect 7: The method of Aspect 5, wherein communicating with the second UE using the first sidelink sub-channel comprises refraining from communicating with the second UE using the guard band disposed between the first RB set and the second RB set based on a capability of at least one of the first UE or the second UE.

Aspect 8: The method of and of Aspects 1 or 2, wherein the mapping between the sidelink sub-channels and RB sets of the unlicensed spectrum comprises the sidelink sub-channels being mapped continuously across the plurality of RB sets and not the one or more guard bands in the unlicensed spectrum.

Aspect 9: The method of Aspect 8, wherein a first sidelink sub-channel of the one or more sidelink sub-channels and a second sidelink sub-channel of the one or more sidelink sub-channels map to a first RB set of the unlicensed spectrum.

Aspect 10: The method of Aspect 9, wherein the second sidelink sub-channel occupies less bandwidth than the first sidelink sub-channel.

Aspect 11: The method of Aspects 9 or 10, wherein the second sidelink sub-channel does not include a physical sidelink control channel (PSCCH) based on an amount of resources in the second sidelink sub-channel available for use being below a threshold.

Aspect 12: The method of and of Aspects 9-11, wherein an amount of bandwidth occupied by each of the sidelink sub-channels is based on a relative frequency location of the corresponding sidelink sub-channel with respect to the one or more guard bands.

Aspect 13: The method of Aspect 9, wherein: a first portion of the second sidelink sub-channel is included within the first RB set of the unlicensed spectrum, a second portion of the second sidelink sub-channel is included within a second RB set of the unlicensed spectrum, and a guard band of the one or more guard bands is disposed between the first RB set and the second RB set.

Aspect 14: The method of Aspect 13, wherein a bandwidth of the first sidelink sub-channel is equal to a sum of a bandwidth of the first portion of the second sidelink sub-channel and a bandwidth of the second portion of the second sidelink sub-channel.

Aspect 15: The method of Aspect 13, wherein: a physical sidelink control channel (PSCCH) in the second sidelink sub-channel is rate matched around the guard band and a physical sidelink shared channel (PSSCH) in the second sidelink sub-channel is one of rate matched into the guard band or rate matched around the guard band based on at least one of a capability of the first UE or a capability of the second UE.

Aspect 16: The method of any of Aspects 8-15, wherein communicating with the second UE via the connection using the one or more sidelink sub-channels comprises performing a listen before talk (LBT) procedure across a first RB set and a second RB set to determine whether resources in the first RB set and resources in the second RB set are available for use and communicating with the second UE using at least one of the one or more sidelink sub-channels spanning the first RB set and the second RB set when, based on the LBT procedure, the resources in the first RB set are available for use and the resources in the second RB set are available for use.

Aspect 17: The method of Aspect 16, wherein communicating with the second UE using the at least one of the one or more sidelink sub-channels further comprises communicating with the second UE using a guard band disposed between the first RB set and the second RB set based on a capability of at least one of the first UE or the second UE.

Aspect 18: The method of Aspect 16, wherein communicating with the second UE using the at least one of the sidelink sub-channels comprises refraining from communicating with the second UE using a guard band disposed between the first RB set and the second RB set based on a capability of at least one of the first UE or the second UE.

Aspect 19: The method of Aspect 1, wherein the mapping between the sidelink sub-channels and the RB sets of the unlicensed spectrum comprises each of the sidelink sub-channels being fully confined within a corresponding RB set of the plurality of RB sets such that no sidelink sub-channel spans a guard band disposed between two RB set of the plurality of RB sets.

Aspect 20: The method of Aspect 19, wherein: the one or more sidelink sub-channels comprise a first sidelink sub-channel confined within a first RB set of the unlicensed spectrum and a second sidelink sub-channel confined within a second RB set of the unlicensed spectrum, the first RB set is disposed adjacent to the second RB set, and the first sidelink sub-channel is disposed adjacent to the second sidelink sub-channel but separated from the second sidelink sub-channel by at least a guard band.

Aspect 21: The method of Aspect 20, further comprising communicating an assignment of resources for communicating with the second UE, wherein the assignment of resources includes resources disposed between the first sidelink sub-channel and the second sidelink sub-channel, including resources in the guard band, and resources in the first sidelink sub-channel and the second side-link sub-channel.

Aspect 22: The method of Aspect 21, wherein communicating with the second UE via the connection comprises communicating via the resources disposed between the first sidelink sub-channel and the second sidelink sub-channel based on at least one of a capability of the first UE or the second UE.

Aspect 23: The method of Aspect 20, further comprising communicating an assignment of resources for communicating with the second UE, wherein the assignment of resources includes a set of resources within the first sidelink sub-channel and the second sidelink sub-channel and excludes resources disposed between the first sidelink sub-channel and the second sidelink sub-channel.

Aspect 24: The method of Aspect 20, further comprising communicating an assignment of resources for communicating with the second UE, wherein the assignment of resources includes a set of resources disposed between the first sidelink sub-channel and the second sidelink sub-channel, not including resources in the guard band, and resources in the first sidelink sub-channel and the second side-link sub-channel.

Aspect 25: The method of Aspect 19: wherein the one or more sidelink sub-channels comprise at least a first set of sidelink sub-channels confined within a first RB set of the unlicensed spectrum and a second set of sidelink sub-channels confined within a second RB set of the unlicensed spectrum.

Aspect 26: The method of Aspect 25, wherein: the first set of sidelink sub-channels comprises at least a first sidelink sub-channel and the second set of sidelink sub-channels comprises at least a second sidelink sub-channel.

Aspect 27: The method of Aspect 26, wherein a first RB in frequency of the first sidelink sub-channel is defined with respect to a lowest indexed RB of a sidelink bandwidth part.

Aspect 28: The method of Aspect 27, wherein the first RB in frequency of the first sidelink sub-channel starts at first offset in frequency from a start of the first RB set of the unlicensed spectrum.

Aspect 29: The method of Aspect 28, wherein a first RB in frequency of the second sidelink sub-channel starts the first offset from a start of the second RB set.

Aspect 30: The method of any of Aspects 28-29, wherein a first RB in frequency of the second sidelink sub-channel is aligned with a start of the second RB set of the unlicensed spectrum.

Aspect 31: The method of Aspect 26, wherein a first RB in frequency of the first sidelink sub-channel is defined with respect to a lowest indexed RB of the first RB set of the unlicensed spectrum.

Aspect 32: The method of Aspect 31, further comprising communicating an indication of a starting RB index, indicating the first RB in frequency of the first sidelink sub-channel and communicating an indication of a number of sidelink sub-channels included within at least the first set of sidelink sub-channels confined within the first RB set of the unlicensed spectrum.

Aspect 33: The method of Aspect 32, wherein communicating with the second UE is based, at least in part, on the starting RB index and the number of sidelink sub-channels included within at least the first set of sidelink sub-channels confined within the first RB set of the unlicensed spectrum.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 14 and/or other operations described herein or communicating using sidelink resources allocated in unlicensed spectrum.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first user equipment (UE), comprising:
one or more processors configured to execute instructions stored on at least one memory to cause the first UE to:
receive an indication of a plurality of resource block (RB) sets in an unlicensed spectrum, wherein one or more guard bands are disposed between RB sets in the plurality of RB sets; and
communicate with a second UE using one or more sidelink sub-channels in the unlicensed spectrum according to a mapping between the one or more sidelink sub-channels and the plurality of RB sets, wherein the mapping comprises the one or more sidelink sub-channels mapped continuously across the RB sets of the plurality of RB sets and the one or more guard bands in the unlicensed spectrum.

2. The first UE of claim 1, wherein the mapping further comprises multiple sidelink sub-channels being mapped to at least one RB set of the plurality of RB sets.

3. The first UE of claim 1, wherein, in order to communicate with the second UE using the one or more sidelink sub-channels, the one or more processors are configured to cause the first UE to:
perform a listen before talk (LBT) procedure across a first RB set and a second RB set to determine whether resources in the first RB set and resources in the second RB set are available for use; and
communicate with the second UE using the first RB set and the second RB set when, based on the LBT procedure, the resources in the first RB set are available for use and the resources in the second RB set are available for use.

4. The first UE of claim 3, wherein, in order to communicate with the second UE, the one or more processors are configured to cause the first UE to additionally communicate with the second UE using a first guard band disposed between the first RB set and the second RB set.

5. The first UE of claim 3, wherein, in order to communicate with the second UE, the one or more processors are configured to cause the first UE to refrain from communicating with the second UE using a first guard band disposed between the first RB set and the second RB set.

6. The first UE of claim 1, wherein the mapping between the sidelink sub-channels and RB sets of the unlicensed spectrum comprises the sidelink sub-channels being mapped continuously across the plurality of RB sets and not the one or more guard bands in the unlicensed spectrum.

7. The first UE of claim 6, wherein a first sidelink sub-channel of the one or more sidelink sub-channels and a second sidelink sub-channel of the one or more sidelink sub-channels map to a first RB set of the unlicensed spectrum.

8. The first UE of claim 7, wherein the second sidelink sub-channel occupies less bandwidth than the first sidelink sub-channel.

9. The first UE of claim 8, wherein the second sidelink sub-channel does not include a physical sidelink control channel (PSCCH) based on an amount of resources in the second sidelink sub-channel available for use being below a threshold.

10. The first UE of claim 7, wherein an amount of bandwidth occupied by each of the sidelink sub-channels is based on a relative frequency location of the corresponding sidelink sub-channel with respect to the one or more guard bands.

11. The first UE of claim 7, wherein:
a first portion of the second sidelink sub-channel is included within the first RB set of the unlicensed spectrum;
a second portion of the second sidelink sub-channel is included within a second RB set of the unlicensed spectrum; and
a guard band of the one or more guard bands is disposed between the first RB set and the second RB set.

12. The first UE of claim 11, wherein a bandwidth of the first sidelink sub-channel is equal to a sum of a bandwidth of the first portion of the second sidelink sub-channel and a bandwidth of the second portion of the second sidelink sub-channel.

13. The first UE of claim 11, wherein:
a physical sidelink control channel (PSCCH) in the second sidelink sub-channel is rate matched around the guard band; and
a physical sidelink shared channel (PSSCH) in the second sidelink sub-channel is one of rate matched into the guard band or rate matched around the guard band based on at least one of a capability of the first UE or a capability of the second UE.

14. The first UE of claim 6, wherein, in order to communicate with the second UE using the one or more sidelink sub-channels, the one or more processors are configured to cause the first UE to:

perform a listen before talk (LBT) procedure across a first RB set and a second RB set to determine whether resources in the first RB set and resources in the second RB set are available for use; and communicate with the second UE using at least one of the one or more sidelink sub-channels spanning the first RB set and the second RB set when, based on the LBT procedure, the resources in the first RB set are available for use and the resources in the second RB set are available for use.

15. The first UE of claim 14, wherein, in order to communicate with the second UE using the at least one of the one or more sidelink sub-channels, the one or more processors are further configured to cause the first UE to communicate with the second UE using a guard band disposed between the first RB set and the second RB set based on a capability of at least one of the first UE or the second UE.

16. The first UE of claim 14, wherein, in order to communicate with the second UE using the at least one of the sidelink sub-channels, the one or more processors are configured to cause the first UE to refrain from communicating with the second UE using a guard band disposed between the first RB set and the second RB set based on a capability of at least one of the first UE or the second UE.

17. The first UE of claim 1, wherein the mapping between the sidelink sub-channels and the RB sets of the unlicensed spectrum comprises each of the sidelink sub-channels being fully confined within a corresponding RB set of the plurality of RB sets such that no sidelink sub-channel spans a guard band disposed between two RB set of the plurality of RB sets.

18. The first UE of claim 17, wherein:
the one or more sidelink sub-channels comprise a first sidelink sub-channel confined within a first RB set of the unlicensed spectrum and a second sidelink sub-channel confined within a second RB set of the unlicensed spectrum;
the first RB set is disposed adjacent to the second RB set; and
the first sidelink sub-channel is disposed adjacent to the second sidelink sub-channel but separated from the second sidelink sub-channel by at least a guard band.

19. The first UE of claim 18, wherein:
the one or more processors are further configured to cause the first UE to communicate an assignment of resources for communicating with the second UE; and
the assignment of resources includes resources disposed between the first sidelink sub-channel and the second sidelink sub-channel, including resources in the guard band, and resources in the first sidelink sub-channel and the second sidelink sub-channel.

20. The first UE of claim 19, wherein, in order to communicate with the second UE, the one or more processors are configured to cause the first UE to communicate via the resources disposed between the first sidelink sub-channel and the second sidelink sub-channel based on at least one of a capability of the first UE or the second UE.

21. The first UE of claim 18, wherein:
the one or more processors are further configured to cause the first UE to communicate an assignment of resources for communicating with the second UE; and
the assignment of resources includes a set of resources within the first sidelink sub-channel and the second sidelink sub-channel and excludes resources disposed between the first sidelink sub-channel and the second sidelink sub-channel.

22. The first UE of claim 18, wherein:
the one or more processors are further configured to cause the first UE to communicate an assignment of resources for communicating with the second UE; and
the assignment of resources includes a set of resources disposed between the first sidelink sub-channel and the second sidelink sub-channel, not including resources in the guard band, and resources in the first sidelink sub-channel and the second sidelink sub-channel.

23. The first UE of claim 17, wherein the one or more sidelink sub-channels comprise at least a first set of sidelink sub-channels confined within a first RB set of the unlicensed spectrum and a second set of sidelink sub-channels confined within a second RB set of the unlicensed spectrum.

24. The first UE of claim 23, wherein:
the first set of sidelink sub-channels comprises at least a first sidelink sub-channel; and
the second set of sidelink sub-channels comprises at least a second sidelink sub-channel.

25. The first UE of claim 24, wherein a first RB in frequency of the first sidelink sub-channel is defined with respect to a lowest indexed RB of a sidelink bandwidth part.

26. The first UE of claim 25, wherein the first RB in frequency of the first sidelink sub-channel starts at a first offset in frequency from a start of the first RB set of the unlicensed spectrum.

27. The first UE of claim 26, wherein a first RB in frequency of the second sidelink sub-channel starts the first offset from a start of the second RB set.

28. The first UE of claim 26, wherein a first RB in frequency of the second sidelink sub-channel is aligned with a start of the second RB set of the unlicensed spectrum.

29. The first UE of claim 24, wherein a first RB in frequency of the first sidelink sub-channel is defined with respect to a lowest indexed RB of the first RB set of the unlicensed spectrum.

30. The first UE of claim 29, wherein the one or more processors are further configured to cause the first UE to:
communicate an indication of a starting RB index, indicating the first RB in frequency of the first sidelink sub-channel; and
communicate an indication of a number of sidelink sub-channels included within at least the first set of sidelink sub-channels confined within the first RB set of the unlicensed spectrum.

31. The first UE of claim 30, wherein the one or more processors are configured to cause the first UE to communicate with the second UE based, at least in part, on the starting RB index and the number of sidelink sub-channels included within at least the first set of sidelink sub-channels confined within the first RB set of the unlicensed spectrum.

32. A method for wireless communication by first user equipment (UE), comprising:
receiving an indication of a plurality of resource block (RB) sets in an unlicensed spectrum, wherein one or more guard bands are disposed between RB sets in the plurality of RB sets; and
communicating with a second UE using one or more sidelink sub-channels in the unlicensed spectrum according to a mapping between the one or more sidelink sub-channels and the plurality of RB sets, wherein the mapping comprises the one or more sidelink sub-channels mapped continuously across the RB sets of the plurality of RB sets and the one or more guard bands in the unlicensed spectrum.

33. A first user equipment (UE), comprising:

means for receiving an indication of a plurality of resource block (RB) sets in an unlicensed spectrum, wherein one or more guard bands are disposed between RB sets in the plurality of RB sets; and means for communicating with a second UE using one or more sidelink sub-channels in the unlicensed spectrum according to a mapping between the one or more sidelink sub-channels and the plurality of RB sets, wherein the mapping comprises the one or more sidelink sub-channels mapped continuously across the RB sets of the plurality of RB sets and the one or more guard bands in the unlicensed spectrum.

\* \* \* \* \*